(12) United States Patent
Robertson et al.

(10) Patent No.: US 11,609,348 B2
(45) Date of Patent: Mar. 21, 2023

(54) HIGH-RESOLUTION ACOUSTIC PIPE CONDITION ASSESSMENT USING IN-BRACKET PIPE EXCITATION

(71) Applicant: Mueller International, LLC, Atlanta, GA (US)

(72) Inventors: Bruce Robertson, Toronto (CA); Valentin Mircea Burtea, Toronto (CA); Sebastien Perrier, Toronto (CA); Joseph Butterfield, Gateshead (GB)

(73) Assignee: Mueller International, LLC, Atlanta, GA (US)

( * ) Notice: Subject to any disclaimer, the term of this patent is extended or adjusted under 35 U.S.C. 154(b) by 237 days.

(21) Appl. No.: 17/136,354

(22) Filed: Dec. 29, 2020

(65) Prior Publication Data
US 2022/0205357 A1 Jun. 30, 2022

(51) Int. Cl.
*G01V 1/00* (2006.01)
*G01N 29/04* (2006.01)
(Continued)

(52) U.S. Cl.
CPC .......... *G01V 1/001* (2013.01); *G01N 29/043* (2013.01); *G01N 29/07* (2013.01); *G01N 29/4454* (2013.01); *G01N 2291/0289* (2013.01)

(58) Field of Classification Search
CPC ...... G01V 1/001; G01N 29/07; E21B 47/107; E21B 47/14
See application file for complete search history.

(56) References Cited

U.S. PATENT DOCUMENTS 3,011,754 A 12/1961 Ander
3,216,244 A 11/1965 Borchers
(Continued)

FOREIGN PATENT DOCUMENTS

CN 1307675 8/2001
CN 202867884 4/2013
(Continued)

OTHER PUBLICATIONS

Yusuf, Shabbir; Office Action for Canadian patent application No. 2,989,333, filed Jun. 10, 2016, dated May 4, 2022, 4 pgs.
(Continued)

*Primary Examiner* — Catherine T. Rastovski
(74) *Attorney, Agent, or Firm* — Taylor English Duma LLP

(57) ABSTRACT

Methods, systems, and computer-readable storage media for performing high-resolution assessment of the condition of pipes of a fluid distribution system using in-bracket excitation. Acoustical impulses are generated in a pipe at two excitation locations along the pipe while signal data is recorded from two acoustic sensors, at least one of the excitation locations being located in-bracket of the two acoustic sensors. A first time delay between the arrival of the acoustical impulses at the two acoustic sensors is computed from the signal data recorded during generation of the impulses at the first excitation location, and a second time delay between the arrival of the impulses at the two sensors is computed from the signal data recorded during generation of the impulses at the second excitation location. An acoustic propagation velocity is computed for a section of the pipe defined by the first and second excitation location based on the first time delay, the second time delay, and a distance between the excitation locations, and a condition of the (Continued)

section of pipe is determined from the computed acoustic propagation velocity.

20 Claims, 10 Drawing Sheets

(51) Int. Cl.
  *G01N 29/07* (2006.01)
  *G01N 29/44* (2006.01)

(56) References Cited

U.S. PATENT DOCUMENTS

| | | | |
|---|---|---|---|
| 3,283,833 | A | 11/1966 | Bodine, Jr. |
| 4,194,246 | A | 3/1980 | Crist |
| 4,289,019 | A | 9/1981 | Claytor |
| 4,929,898 | A | 5/1990 | Spies |
| 5,031,446 | A | 7/1991 | Saito et al. |
| 5,037,327 | A | 8/1991 | Van Woensel |
| 5,416,724 | A | 5/1995 | Savic |
| 5,526,689 | A | 6/1996 | Coulter et al. |
| 5,531,099 | A | 7/1996 | Russo |
| 5,581,037 | A | 12/1996 | Kwun et al. |
| 5,836,787 | A | 11/1998 | Kodama |
| 6,289,723 | B1 | 9/2001 | Leon |
| 6,435,030 | B1 | 8/2002 | Gysling et al. |
| 6,453,247 | B1 | 9/2002 | Hunaidi |
| 6,556,924 | B1 | 4/2003 | Kariyawasam et al. |
| 6,561,032 | B1 | 5/2003 | Hunaidi |
| 7,007,545 | B1 | 3/2006 | Martinek |
| 7,059,176 | B2 | 6/2006 | Sparks |
| 7,095,676 | B2 | 8/2006 | D'Angelo et al. |
| 7,203,322 | B1 | 4/2007 | Bostock |
| 7,266,992 | B2 | 9/2007 | Shamout et al. |
| 7,283,913 | B2 | 10/2007 | Garnaes |
| 7,328,618 | B2 | 2/2008 | Hunaidi et al. |
| 7,475,596 | B2 | 1/2009 | Hunaidi et al. |
| 7,624,650 | B2 | 12/2009 | Gysling et al. |
| 7,752,918 | B2 | 7/2010 | Davis |
| 7,810,378 | B2 | 10/2010 | Hunaidi et al. |
| 7,830,273 | B2 | 11/2010 | Twitchell, Jr. |
| 7,940,189 | B2 | 5/2011 | Brown |
| 7,962,293 | B2 | 6/2011 | Gysling |
| 8,296,083 | B2 | 10/2012 | Martin |
| 8,601,875 | B2 | 12/2013 | Paulson |
| 8,695,418 | B2 | 4/2014 | Sparks et al. |
| 8,816,866 | B2 | 8/2014 | Day |
| 8,966,979 | B2 | 3/2015 | Amundsen |
| 9,053,519 | B2 | 6/2015 | Scolnicov et al. |
| 9,291,520 | B2 | 3/2016 | Fleury, Jr. et al. |
| 9,541,432 | B2 | 1/2017 | Kertesz |
| 9,651,445 | B2 | 5/2017 | Mcintyre |
| 9,670,650 | B2 | 6/2017 | Pinney et al. |
| 9,799,204 | B2 | 10/2017 | Hyland et al. |
| 9,816,848 | B2 | 11/2017 | Raykhman et al. |
| 9,835,592 | B2 | 12/2017 | Yusuf et al. |
| 10,067,092 | B2 | 9/2018 | Burtea et al. |
| 10,209,225 | B2 | 2/2019 | Perrier |
| 10,267,774 | B2 | 4/2019 | Yusuf et al. |
| 10,509,012 | B2 | 12/2019 | Perrier |
| 10,565,752 | B2 | 2/2020 | Perrier et al. |
| 10,690,630 | B2 | 6/2020 | Perrier et al. |
| 10,768,146 | B1 | 9/2020 | Burtea et al. |
| 10,845,340 | B2 | 11/2020 | Burtea et al. |
| 2001/0032064 | A1 | 10/2001 | Araki et al. |
| 2003/0033870 | A1 | 2/2003 | Shah et al. |
| 2003/0033879 | A1 | 2/2003 | Adewumi |
| 2003/0185100 | A1 | 10/2003 | D'Angelo et al. |
| 2004/0169108 | A1 | 9/2004 | Terpay |
| 2005/0000289 | A1 | 1/2005 | Gysling et al. |
| 2005/0210960 | A1 | 9/2005 | Shamout et al. |
| 2006/0283251 | A1* | 12/2006 | Hunaidi ............... G01N 29/222 73/597 |
| 2007/0041333 | A1 | 2/2007 | Twitchell |
| 2008/0078247 | A1 | 4/2008 | Hunaidi et al. |
| 2008/0314122 | A1 | 12/2008 | Hunaidi |
| 2009/0250125 | A1 | 10/2009 | Howitt |
| 2010/0175477 | A1 | 7/2010 | Kasai et al. |
| 2011/0161037 | A1 | 6/2011 | Sutherland |
| 2012/0041694 | A1 | 2/2012 | Stephens et al. |
| 2012/0055262 | A1 | 3/2012 | Sinha |
| 2012/0125111 | A1 | 5/2012 | Groos et al. |
| 2012/0167688 | A1 | 7/2012 | Minachi et al. |
| 2013/0025375 | A1 | 1/2013 | Goldner et al. |
| 2013/0036796 | A1 | 2/2013 | Fleury et al. |
| 2013/0058819 | A1 | 3/2013 | Kodama et al. |
| 2013/0211797 | A1 | 8/2013 | Scolnicov |
| 2013/0213482 | A1 | 8/2013 | Schuberth |
| 2013/0240093 | A1 | 9/2013 | Okada |
| 2015/0247777 | A1 | 9/2015 | Kondou |
| 2015/0300907 | A1 | 10/2015 | Giunta et al. |
| 2016/0041286 | A1 | 2/2016 | Sinha et al. |
| 2016/0208952 | A1 | 7/2016 | Howitt |
| 2016/0223120 | A1 | 8/2016 | Gagliardo |
| 2016/0252422 | A1 | 9/2016 | Howitt |
| 2016/0290974 | A1 | 10/2016 | Coleman |
| 2016/0370325 | A1 | 12/2016 | Yusuf |
| 2017/0176395 | A1 | 6/2017 | Burtea |
| 2017/0191966 | A1* | 7/2017 | Niri ...................... G01N 29/225 |
| 2017/0248555 | A1 | 8/2017 | Yusuf et al. |
| 2018/0306753 | A1 | 10/2018 | Perrier |
| 2018/0306755 | A1 | 10/2018 | Perrier et al. |
| 2018/0308265 | A1 | 10/2018 | Perrier et al. |
| 2018/0340912 | A1 | 11/2018 | Burtea et al. |
| 2019/0128766 | A1 | 5/2019 | Burtea et al. |
| 2019/0128767 | A1 | 5/2019 | Burtea |
| 2019/0128848 | A1 | 5/2019 | Perrier |
| 2019/0390990 | A1 | 12/2019 | Krywyj et al. |
| 2020/0124182 | A1 | 4/2020 | Abouelleil et al. |
| 2020/0240821 | A1* | 7/2020 | Ebert ................... G01B 17/025 |
| 2022/0026395 | A1 | 1/2022 | Burtea et al. |
| 2023/0017820 | A1 | 1/2023 | Burtea et al. |

FOREIGN PATENT DOCUMENTS

| | | | |
|---|---|---|---|
| CN | 2003404430 | | 1/2014 |
| CN | 106289121 | | 1/2017 |
| EP | 3392636 | | 10/2018 |
| FR | 2754898 | | 4/1998 |
| JP | 2002236115 | | 8/2002 |
| KR | 20180079128 | * | 7/2018 |
| WO | 2003048713 | | 6/2003 |
| WO | 2010020817 | | 2/2010 |
| WO | 2014050618 | | 4/2014 |
| WO | 2015031180 | | 3/2015 |
| WO | 2015073313 | | 5/2015 |
| WO | 2016160267 | | 10/2016 |
| WO | 2016205082 | | 12/2016 |
| WO | 2023003778 | | 1/2023 |

OTHER PUBLICATIONS

Yusuf, Shabbir; Summons to Attend Oral Proceedings for European application No. 16812182.0, filed Jun. 10, 2016, dated Jul. 8, 2022, 7 pgs.

Yusuf, Shabbir; Office Action for Chinese patent application No. 201680043097.1, filed Jun. 10, 2016, dated Dec. 27, 2019, 20 pgs.

Muggleton, et al.; "Axisymmetric wave propagation in fluid-filled pipes: wavenumber measurements in vacuo and buried pipes," 581 Journal of Sound and Vibration, 270(1) (2004), 20 pgs.

Sewerin; Operating Instructions for Combiphon, dated Dec. 10, 2011; 32 pgs.

Coleman, Matthew Simon; Final Office Action for U.S. Appl. No. 14/674,851, filed Mar. 31, 2015, dated Dec. 15, 2017, 38 pgs.

Coleman, Matthew Simon; Final Office Action for U.S. Appl. No. 14/674,851, filed Mar. 31, 2015, dated May 21, 2018, 36 pgs.

Coleman, Matthew Simon; Non-Final Office Action for U.S. Appl. No. 14/674,851, filed Mar. 31, 2015, dated Jun. 16, 2017, 50 pgs.

Hay, Lindsay; "The Influence of Soil Properties on the Performance of Underground Pipelines", Department of Soil Science, The Faculty of Agriculture, The University of Sydney, Aug. 1984, 243 pgs.

(56) References Cited

OTHER PUBLICATIONS

Makar, et al.; "Failure Modes and Mechanisms in Gray Cast Iron Pipe", National Research Council Canada, Copyright 2000, 11 pgs.
Muster, et al.; "Life Expectancy of Cement Mortar Linings in Cast and Ductile Iron Pipes", Water Research Foundation, Copyright 2011, 192 pgs.
Rajani, et al.; "Impact of Soil Properties on pipe corrosion: re-examination of traditional conventions", National Research Council Canada, Sep. 2010, 17 pgs.
Rajani, et al.; "Investigation of Grey Cast Iron Water Mains to Develop a Methodology for Estimating Service Life", AWWA Research Foundation, Copyright 2000, 294 pgs.
Burtea, Valentin Mircea; Issue Notification for U.S. Appl. No. 14/974,351, filed Dec. 18, 2015, dated Aug. 21, 2018, 1 pg.
Burtea, Valentin Mircea; Non-Final Office Action for U.S. Appl. No. 14/974,351, filed Dec. 18, 2015, dated Nov. 3, 2017, 33 pgs.
Burtea, Valentin Mircea; Notice of Allowance for U.S. Appl. No. 14/974,351, filed Dec. 18, 2015, dated May 10, 2018, 10 pgs.
Burtea, Valentin Mircea; Supplemental Notice of Allowance for U.S. Appl. No. 14/974,351, filed Dec. 18, 2015, dated May 24, 2018, 6 pgs.
Burtea, Valentin Mircea; Supplemental Notice of Allowance for U.S. Appl. No. 14/974,351, filed Dec. 18, 2015, dated Aug. 10, 2018, 6 pgs.
Burtea, Valentin Mircea; Non-Final Office Action for U.S. Appl. No. 16/054,078, filed Aug. 3, 2018, dated Jun. 1, 2020, 47 pgs.
Burtea, Valentin Mircea; Notice of Allowance for U.S. Appl. No. 16/054,078, filed Aug. 3, 2018, dated Aug. 20, 2020, 5 pgs.
Burtea, Valentin Mircea; Supplemental Notice of Allowance for U.S. Appl. No. 16/054,078, filed Aug. 3, 2018, dated Oct. 23, 2020, 6 pgs.
Burtea, Valentin Mircea; Supplemental Notice of Allowance for U.S. Appl. No. 16/054,078, filed Aug. 3, 2018, dated Oct. 6, 2020, 6 pgs.
Yusuf, Shabbir; Issue Notification for U.S. Appl. No. 15/056,403, filed Feb. 29, 2016, dated Apr. 3, 2019, 1 pg.
Yusuf, Shabbir; Non-Final Office Action for U.S. Appl. No. 15/056,403, filed Feb. 29, 2016, dated Jan. 30, 2018, 29 pgs.
Yusuf, Shabbir; Non-Final Office Action for U.S. Appl. No. 15/056,403, filed Feb. 29, 2016, dated Aug. 9, 2018, 17 pgs.
Yusuf, Shabbir; Notice of Allowance for U.S. Appl. No. 15/056,403, filed Feb. 29, 2016, dated Jan. 2, 2019, 13 pgs.
Yusuf, Shabbir; Supplemental Notice of Allowance for U.S. Appl. No. 15/056,403, filed Feb. 29, 2016, dated Feb. 14, 2019, 6 pgs.
Coleman, Matthew Simon; International Preliminary Report on Patentability for PCT Application No. PCT/US2016/020889, filed Mar. 4, 2016, dated Oct. 12, 2017, 13 pgs.
Coleman, Matthew, Simon; International Search Report and Written Opinion for PCT Application No. PCT/US2016/020889, filed Mar. 4, 2016, dated Jun. 6, 2016, 14 pgs.
De Silva et al., Condition Assessment and Probabilistic Analysis to Estimate Failure Rates in Buried Pipelines, Thermo Scientific, In: Proceedings of ASTT 5th Conference. Aug. 2002 {Aug. 2002). Retrieved from <https://www.researchgate.net/profile/Magnus_Moglia/publication/236834972_Condition_Assessment_and_Probabilistic_Analaysis_to_Estimate_Failure_Rates_in_Buried_Pipelines/links/00b7d51945e4007c48000000/pdf>, 21 pgs.
Sheppard et al., Cast Iron Fitness for Purpose (FFP)—Final Report, Macaw Engineering, Ltd., Jun. 3, 2015, Retrieved from <http://www.smartemetworks.org/Files/Cast_Iron_Fitness_For_Purpose_{CIFFP)_151214123856.pdf>, 91 pgs.
Yusuf, Shabbir; International Preliminary Report on Patentability for serial No. PCT/US2016/036856, filed Jun. 10, 2016, dated Dec. 28, 2017, 9 pgs.
Yusuf, Shabbir; International Search Report and Written Opinion for serial No. PCT/US2016/036856, filed Jun. 10, 2016, dated Sep. 9, 2016, 10 pgs.
Yusuf, Shabbir; Examination Report for Australian patent application No. 2016280629, filed Jun. 10, 2016, dated Dec. 1, 2020, 4 pgs.
Yusuf, Shabbir; Examination Report for Australian patent application No. 2016280629, filed Jun. 10, 2016, dated Sep. 17, 2020, 4 pgs.
Baik, et al.; Article entitled: "Acoustic Attenuation, phase and group velocities in liquid-filled pipes: Theory, experiment, and examples of water and mercury", The Journal of the Acoustical Society of America, Nov. 2010, 16 pgs.
Fan, Peng; Article entitled: "Prevention of Industrial Noise and Vibration", Shenyang Publishing House, Dec. 1997, 7 pgs.
Yuan, et al.; Article entitled: "Noise Control Principles and Technologies", Northeastern University Press Shenyang, accessed on Apr. 22, 2020, 33 pgs.
Yusuf, Shabbir; Office Action for Chinese patent application No. 201680043097.1, filed Jun. 10, 2016, dated Jan. 4, 2021, 22 pgs.
Yusuf, Shabbir; Office Action for Chinese patent application No. 201680043097.1, filed Jun. 10, 2016, dated Apr. 21, 2021, 20 pgs.
Yusuf, Shabbir; Office Action for Chinese patent application No. 201680043097.1, filed Jun. 10, 2016, dated May 22, 2020, 15 pgs.
Baik, et al; Article entitled: "Acoustic attenuation, phase and group velocities in liquid-filled pipes: Theory, experiment, and examples of water and mercury", The Journal of the Acoustic Society of America, vol. 128, No. 5, Nov. 1, 2010, 15 pgs.
Price, John; Article entitled: "Acoustic Waveguides", Jan. 22, 2008 (Jan. 22, 2008), XP055522269, Retrieved from the inventor: http://spot.colorado.edu/~pricej/downloads/AcousticWaveguides.pdf; retrieved on Nov. 8, 2018, 32 pgs.
Yusuf, Shabbir; Extended European Search Report for serial No. 16812182.0, filed Jun. 10, 2016, dated Nov. 21, 2018, 22 pgs.
Yusuf, Shabbir; Office Action for European serial No. 16812182.0, filed Jun. 10, 2016, dated Nov. 22, 2019, 6 pgs.
Yusuf, Shabbir; Office Action for European serial No. 16812182.0, filed Jun. 10, 2016, dated Nov. 26, 2020, 6 pgs.
Yusuf, Shabbir; Office Action for Malaysia patent application No. 2017704843, filed Jun. 10, 2016, dated May 11, 2021, 2 pgs.
Baik, et al.; Article entitled: "Acoustic attenuation, phase and group velocities in liquid-filled pipes . . . ", 2010 Acoustical Society of America, published Nov. 2010, 15 pgs.
Yusuf, Shabbir; Notice of Eligibility for Grant for Singapore patent application No. 11201710434V, filed Jun. 10, 2016, dated Mar. 29, 2019, 7 pgs.
Yusuf, Shabbir; Written Opinion for Singapore patent application No. 11201710434V, filed Jun. 10, 2016, dated May 31, 2018, 6 pgs.
Amir, et al.; Article entitled: "A discrete model for tubular acoustic systems with varying cross section—the direct and inverse problems. parts 1 and 2: Theory and experiment," Acustica, 81:450-474 (1995), 25 pgs.
Jonathan A Kemp; "Theoretical and experimental study of wave propagation in brass musical instruments (PhD thesis)," 2002, available at <http://www.kempacoustics.com/thesis/thesis.html>, 232 pgs.
Muggleton, et al..; ,"Axisymmetric wave propagation in buried, fluid-filled pipes: effects of wall discontinuities", Journal of Sound and Vibration 281 (2005) 849-867, 19 pgs.
Muggleton, et al.; "Wavenumber prediction of waves in buried pipes for water leak detection." J. Sound Vib. 2002, 249, 939-954 (2002), 16 pgs.
Baik, et al; Article entitled: "Acoustic attenuation, phase and group velocities in liquid-filled pipes: Theory, experiment, and examples of water and mercury", J. Acoust. Soc. Am. 128(5), Nov. 2010, 15 pgs.
Yusuf, Shabbir; Issue Notification for U.S. Appl. No. 14/740,902, filed Jun. 16, 2015, dated Nov. 15, 2017, 1 pg.
Yusuf, Shabbir; Non-Final Office Action for U.S. Appl. No. 14/740,902, filed Jun. 16, 2015, dated Apr. 27, 2017, 22 pgs.
Yusuf, Shabbir; Notice of Allowance for U.S. Appl. No. 14/740,902, filed Jun. 16, 2015, dated Aug. 30, 2017, 5 pgs.
Yusuf, Shabbir; Supplemental Notice of Allowability for U.S. Appl. No. 14/740,902, filed Jun. 16, 2015, dated Sep. 15, 2017, 4 pgs.
Perrier, Sebastien; Issue Notification for U.S. Appl. No. 15/493,899, filed Apr. 21, 2017, dated Jan. 30, 2019, 1 pg.
Perrier, Sebastien; Notice of Allowance for U.S. Appl. No. 15/493,899, filed Apr. 21, 2017, dated Sep. 24, 2018, 13 pgs.

(56) References Cited

OTHER PUBLICATIONS

Perrier, Sebastien; Supplemental Notice of Allowance for U.S. Appl. No. 15/493,899, filed dated Nov. 9, 2018, 6 pgs.

Perrier, Sebastien; Non-Final Office Action for U.S. Appl. No. 16/232,268, filed Dec. 26, 2018, dated Jun. 13, 2019, 15 pgs.

Perrier, Sebastien; Notice of Allowance for U.S. Appl. No. 16/232,268, filed Dec. 26, 2018, dated Sep. 6, 2019, 9 pgs.

Perrier, Sebastien; Supplemental Notice of Allowance for U.S. Appl. No. 16/232,268, filed Dec. 26, 2018, dated Nov. 22, 2019, 6 pgs.

Leinov et al, "Investigation of guided wave propagation and attenuation in pipe buried in sand", J of Sound and Vibration 347 (2015) 96-114.

Long et al., "The effect of soil properties on acoustic wave propagation in buried iron water pipes", AIP Conference Proceedings 615, 1310 (2002).

Perrier, Sebastien; Corrected Notice of Allowance for U.S. Appl. No. 15/493,914, filed Apr. 21, 2017, dated Feb. 20, 2020, 6 pgs.

Perrier, Sebastien; Corrected Notice of Allowance for U.S. Appl. No. 15/493,914, filed Apr. 21, 2017, dated Mar. 6, 2020, 6 pgs.

Perrier, Sebastien; Corrected Notice of Allowance for U.S. Appl. No. 15/493,914, filed Apr. 21, 2017, dated May 22, 2020, 10 pgs.

Perrier, Sebastien; Ex Parte Quayle Action for U.S. Appl. No. 15/493,914, filed Apr. 21, 2017, mailed Jun. 13, 2019, 15 pgs.

Perrier, Sebastien; Non-Final Office Action for U.S. Appl. No. 15/493,914, filed Apr. 21, 2017, dated Dec. 14, 2018, 19 pgs.

Perrier, Sebastien; Notice of Allowance for U.S. Appl. No. 15/493,914, filed Apr. 21, 2017, dated Nov. 20, 2019, 19 pgs.

Perrier, Sebastien; Non-Final Office Action for U.S. Appl. No. 15/493,906, filed Apr. 21, 2017, dated Jul. 5, 2019, 22 pgs.

Perrier, Sebastien; Notice of Allowance for U.S. Appl. No. 15/493,906, filed Apr. 21, 2017, dated Oct. 2, 2019, 11 pgs.

De Almeida, et al.; Article entitled: "Measurement of Wave Attenuation in Buried Plastic Water Distribution Pipes", Journal of Mechanical Engineering, published on Apr. 1, 2014, 9 pgs.

Oelze, et al.; Article entitled: "Measurement of Attenuation and Speed of Sound in Soils", Soil Sci. Soc. Am. J., vol. 66, May-Jun. 2002, 9 pgs.

Perrier, Office Action for European for application No. 18166849.2, filed Apr. 11, 2018, dated Feb. 3, 2020, 6 pgs.

Perrier, Office Action for European for application No. 18166849.2, filed Apr. 11, 2018, dated Sep. 19, 2019, 5 pgs.

Perrier, Sebastien; Extended European Search Report for application No. 18166849.2, filed Apr. 11, 2018, dated Jul. 19, 2018, 7 pgs.

Burtea, Valentin Mircea; Notice of Allowance for U.S. Appl. No. 16/659,333, filed Oct. 21, 2019, dated Apr. 28, 2020, 18 pgs.

Burtea, Valentin Mircea; Supplemental Notice of Allowance for U.S. Appl. No. 16/659,333, filed Oct. 21, 2019, dated Jul. 31, 2020, 6 pgs.

Burtea, Valentin Mircea; Supplemental Notice of Allowance for U.S. Appl. No. 16/659,333, filed Oct. 21, 2019, dated May 6, 2020, 6 pgs.

Huang, N. E., "The empirical mode decomposition and the Hilbert spectrum for nonlinear and non-stationary time series analysis", Proceedings of the Royal Society of London Series A, vol. 454, No. 1971, pp. 903-998, Copyright 1998, 93 pgs.

Long, et al., Article entitled: "Axisymmetric Modes that Propagate in Buried Iron Water Pipes", View Affiliations AIP Conference Proceedings 657:1, Copyright 2003, 1201-1208, 8 pgs.

Almeida, et al.; Article entitled: "On the Acoustic Filtering of the Pipe and Sensor in a Buried Plastic Water Pipe and its Effect on Leak Detection: an Experimental Investigation", Sensors, Copyright 2014, 16 pgs.

Burtea, Valentin Mircea; Non-Final Office Action for U.S. Appl. No. 16/935,945, filed Jul. 22, 2020, dated Nov. 14, 2022, 55 pgs.

Burtea, Valentin Mircea; International Search Report and Written Opinion for PCT Application No. PCT/US22/37322, filed Jul. 15, 2022, dated Nov. 22, 2022, 14 pgs.

* cited by examiner

HIGH-RESOLUTION ACOUSTIC PIPE CONDITION ASSESSMENT USING IN-BRACKET PIPE EXCITATION

BRIEF SUMMARY

The present disclosure relates to technologies for performing high-resolution assessment of the condition of pipes of a fluid distribution system by in-bracket excitation of the pipes in multiple locations. According to some embodiments, a method comprises generating acoustical impulses in a pipe at a first excitation location while recording signal data at a first acoustic sensor and a second acoustic sensor in acoustical communication with the pipe. The signal data represents the arrival of the acoustical impulses at the first and second acoustic sensors. Acoustical impulses are further generated in the pipe at a second excitation location while signal data is recorded at the first and second acoustic sensors. At least one of the first excitation location and second excitation location is located in-bracket of the first acoustic sensor and the second acoustic sensor. A first time delay between the arrival of the acoustical impulses at the first and second acoustic sensors is computed from the signal data recorded at the first and second acoustic sensors during generation of the acoustical impulses at the first excitation location, and a second time delay between the arrival of the acoustical impulses at the first and second sensors is computed from the signal data recorded at the first and second acoustic sensors during generation of the acoustical impulses at the second excitation location. An acoustic propagation velocity is computed for a section of the pipe defined by the first excitation location and the second excitation location based on the first time delay, the second time delay, and a distance between the first and second excitation locations, and the computed acoustic propagation velocity is utilized to determine a condition of the section of the pipe.

According to further embodiments, a computer-readable medium comprises processor-executable instructions that cause a processor of a pipe assessment system to record signal data from a first acoustic sensor and a second acoustic sensor during generation of acoustical impulses in a pipe of a fluid distribution system at a first excitation location, the first and second acoustic sensors in acoustical communication with the pipe. The processor further records signal data from the first acoustic sensor and the second acoustic sensor during generation of acoustical impulses in the pipe at a second excitation location, at least one of the excitation locations being located in-bracket of the first and second acoustic sensors. A first time delay between an arrival of the acoustical impulses at the first acoustic sensor and the second acoustic sensor is computed from the signal data recorded from the first and second acoustic sensors during generation of the acoustical impulses at the first excitation location and a second time delay between the arrival of the acoustical impulses at the first acoustic sensor and the second acoustic sensor is computed from the signal data recorded at the first and second acoustic sensors during generation of the acoustical impulses at the second excitation location. An acoustic propagation velocity in a section of the pipe defined by the first excitation location and the second excitation location is computed based on the first time delay, the second time delay, and a distance between the first and second excitation locations, and the acoustic propagation velocity is then used to determine a condition of the section of the pipe.

According to further embodiments, a water distribution system comprises a pipe, first and second acoustic sensors, and an acoustic analysis module executing on a pipe assessment system communicatively coupled to the first and second acoustic sensors. The first and second acoustic sensors are in acoustical communication with the pipe and configured to sense acoustical impulses propagating through the pipe and produce signal data representing the sensed acoustical impulses. The acoustic analysis module is configured to record signal data from the first and second acoustic sensors during generation of acoustical impulses in the pipe at first and second excitation locations. The acoustic analysis module computes a first time delay between an arrival of the acoustical impulses at the first acoustic sensor and the second acoustic sensor from the signal data recorded from the first and second acoustic sensors during generation of the acoustical impulses at the first excitation location, and a second time delay between the arrival of the acoustical impulses at the first acoustic sensor and the second acoustic sensor from the signal data recorded at the first and second acoustic sensors during generation of the acoustical impulses at the second excitation location. An acoustic propagation velocity in a first section of the pipe defined by the first excitation location and the second excitation location is then computed based on the first time delay, the second time delay, and a distance between the first and second excitation locations.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for performing high-resolution assessment of the condition of pipes of a fluid distribution system by in-bracket excitation of the pipes in multiple locations. Water distribution mains may degrade in several ways. For example, metal pipe walls may corrode and become thinner and weaker (less stiff). Asbestos cement pipes lose calcium and the wall losses strength in time. The wall of pre-stressed concrete pipes gets weaker if the steel wires break. These degradations may cause hydraulic failure of the distribution system.

As described in, e.g., U.S. patent application Ser. No. 09/570,922, filed May 15, 2000, and issued as U.S. Pat. No. 6,561,032; U.S. patent application Ser. No. 11/156,573, filed Jun. 21, 2005, and issued as U.S. Pat. No. 7,328,618; and U.S. patent application Ser. No. 11/952,582, filed Dec. 7, 2007, and issued as U.S. Pat. No. 7,475,596, the disclosures of which are incorporated herein by this reference in their entireties, methods for assessing the condition of, e.g., predicting the stiffness and/or wall thickness of, pipes of a water or other fluid distribution system may rely on measuring the propagation velocity of sound (referred to herein as "acoustical propagation velocity") in a given pipe section. The acoustical propagation velocity may be determined by placing two acoustic or vibration sensors on the pipe, on associated appurtenances, or in contact with the fluid at known locations bracketing the pipe segment under test, and generating an out-of-bracket sound. The sound propagates along the pipe segment reaching first the near acoustic sensor, i.e. the sensor closest to the sound generator, and then the far acoustic sensor. The signals from the two sensors are recorded, and signal processing is applied to estimate the time delay between the sound reaching the near and far sensors (i.e., the time it takes for the sound to travel from one sensor to the other).

Figure 1:
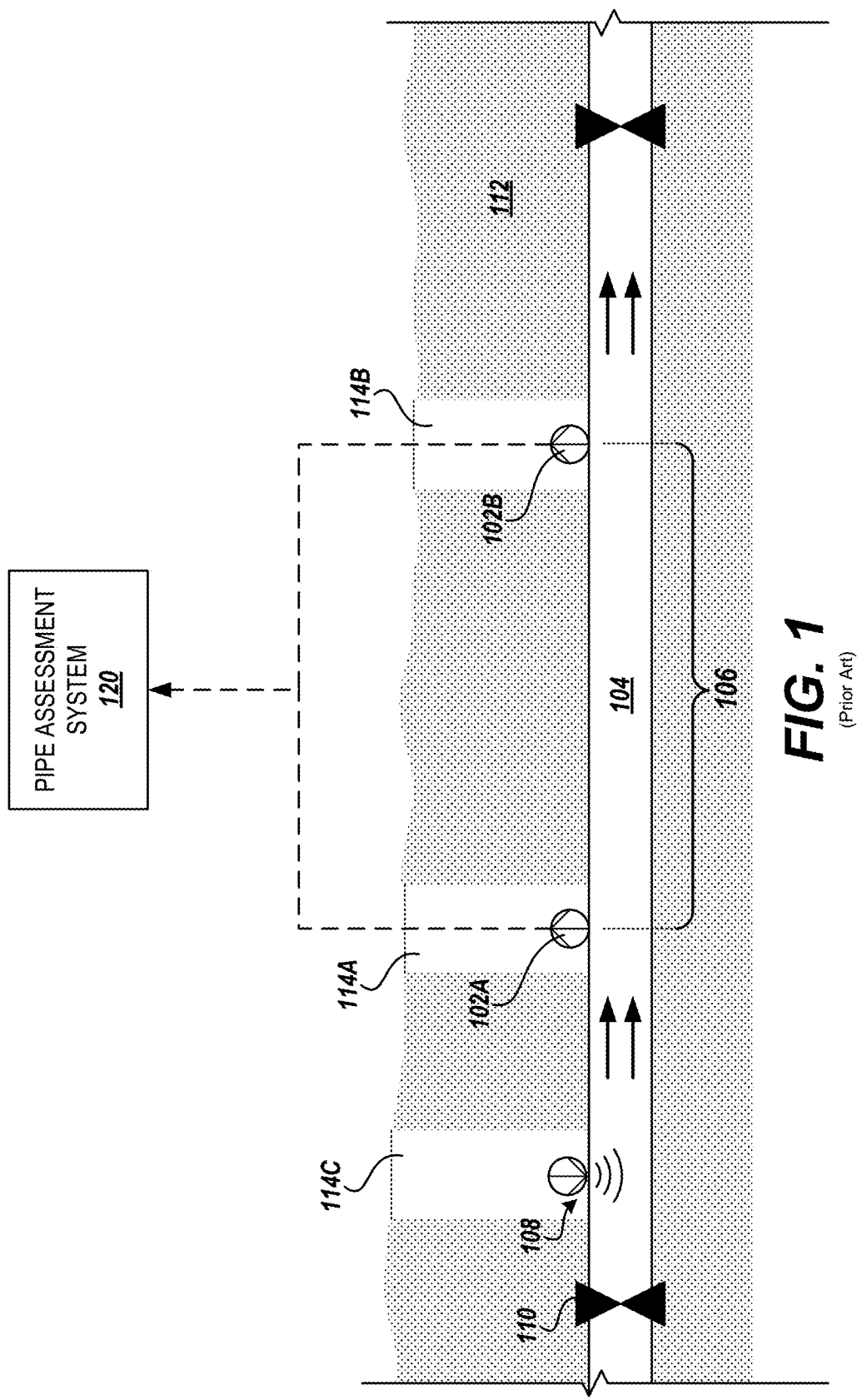
FIG. 1 is a block diagram showing a conventional system for estimating the condition of pipes of a fluid distribution system.

FIG. 1 shows a conventional setup for determining the speed of sound in a pipe section, according to embodiments. Acoustic sensors 102A and 102B (referred to herein generally as acoustic sensors 102) are placed in acoustical communication with a pipe 104 of a fluid distribution system, at either end of the pipe section 106 under test (also referred to herein as the "target pipe section 106"). For purposes of this disclosure, a component or device being "in acoustical communication with" the pipe 104 represents the component being connected directly or indirectly coupled to the pipe in such a way that vibrations, acoustical impulses, or other variations in pressure traveling through the pipe wall and/or the fluid in the pipe can be produced or sensed by the component.

Acoustical sound is introduced into the pipe 104 at an "out-of-bracket" position, i.e., outside of the target pipe section 106 bracketed by the acoustic sensors 102, as shown at 108. The acoustical sound may be generated by any means suitable for the creation of acoustical impulses or vibrations in the pipe 104, including a manual excitation by a human using a hammer to strike the pipe wall or appurtenance or controlled excitation by a mechanical or electro-mechanical device, as will be described in more detail below. The acoustic sensors 102A and 102B sense the acoustical impulses in the pipe 104 at their respective locations and produce a signal representing the sensed impulses.

Signal data representing the signal from the respective acoustic sensors 102A and 102B is sent to a pipe assessment system 120. The pipe assessment system 120 may then process and analyze the signal data to assess the condition of the section 106 of the pipe 104 bracketed by the acoustic sensors 102. For example, timing information of acoustical impulses in the signals may be extracted from the respective signal data from the acoustic sensors 102A and 102B, and a time delay between the arrival of the acoustical impulses at the near acoustic sensor 102A and the far acoustic sensor 102B may be estimated. With a known distance between the two acoustic sensors 102A and 102B and the estimated time delay, the pipe assessment system 120 can determine the acoustical propagation velocity of the impulses in the target pipe section 106. The measured acoustical propagation velocity may then be compared with a reference speed of sound for that specific pipe class and material, with any differences used to determine the condition of the target pipe section 106.

While the methods described above generally work well, only the condition of the bracketed target pipe section 106 as a whole is assessed, and not changes in condition of the pipe along the length of the section on a local scale. In addition, the pipe 104 may be partially or wholly subterraneous, and potholes, such as potholes 114A and 114B (referred to herein generally as potholes 114), are generally required in order to place the acoustic sensors 102 directly in contact with an outer surface of the pipe in order to detect the generated acoustical impulses with sufficient SNR. Similarly, another pothole 114C may be necessary in the out-of-bracket excitation location 108 in order to access the outer surface of the pipe 104 for generation of the acoustical impulses. Providing potholes 114 for placement of acoustic sensors 102 along the target pipe section 106 may involve significant expense and disruption due to excavation works. The acoustic sensors 102 must also be repositioned to bracket another target pipe section 106 in order to run the test again for a different section of the pipe 104.

According to embodiments described herein, systems and methods for estimating the acoustical propagation velocity in one or more pipe sections 106 may be implemented whereby acoustic sensors 102 need not be placed directly on the pipe 104 bracketing each section. Instead, two acoustic sensors may be placed on appurtenances of the fluid distribution network, e.g., valves, or on the pipe itself, at locations at either end of a segment of the pipe incorporating the target pipe section(s) 106. The pipe can then be excited at two distinct in-bracket locations with the signal data from the acoustic sensors 102 being recorded separately for each excitation. By comparing the time delay in the arrival of acoustical impulses between the two acoustic sensors 102 from the excitation at the two locations, the acoustical propagation velocity of the impulses in the target pipe section 106 between the two excitation locations may be estimated, and the condition of the target pipe section 106 assessed accordingly. In addition, by performing excitation of the pipe 104 at multiple, in-bracket and out-of-bracket locations and comparing the time delays associated with excitation at adjacent locations, the acoustical propagation velocity in multiple sections of the pipe in the segment bracketed by sensors 102 may be obtained, allowing for a higher resolution of condition assessment of the pipe 104 than conventional methods without having to remove and replace the sensors at new locations, as will be described in more detail below.

Figure 2A:
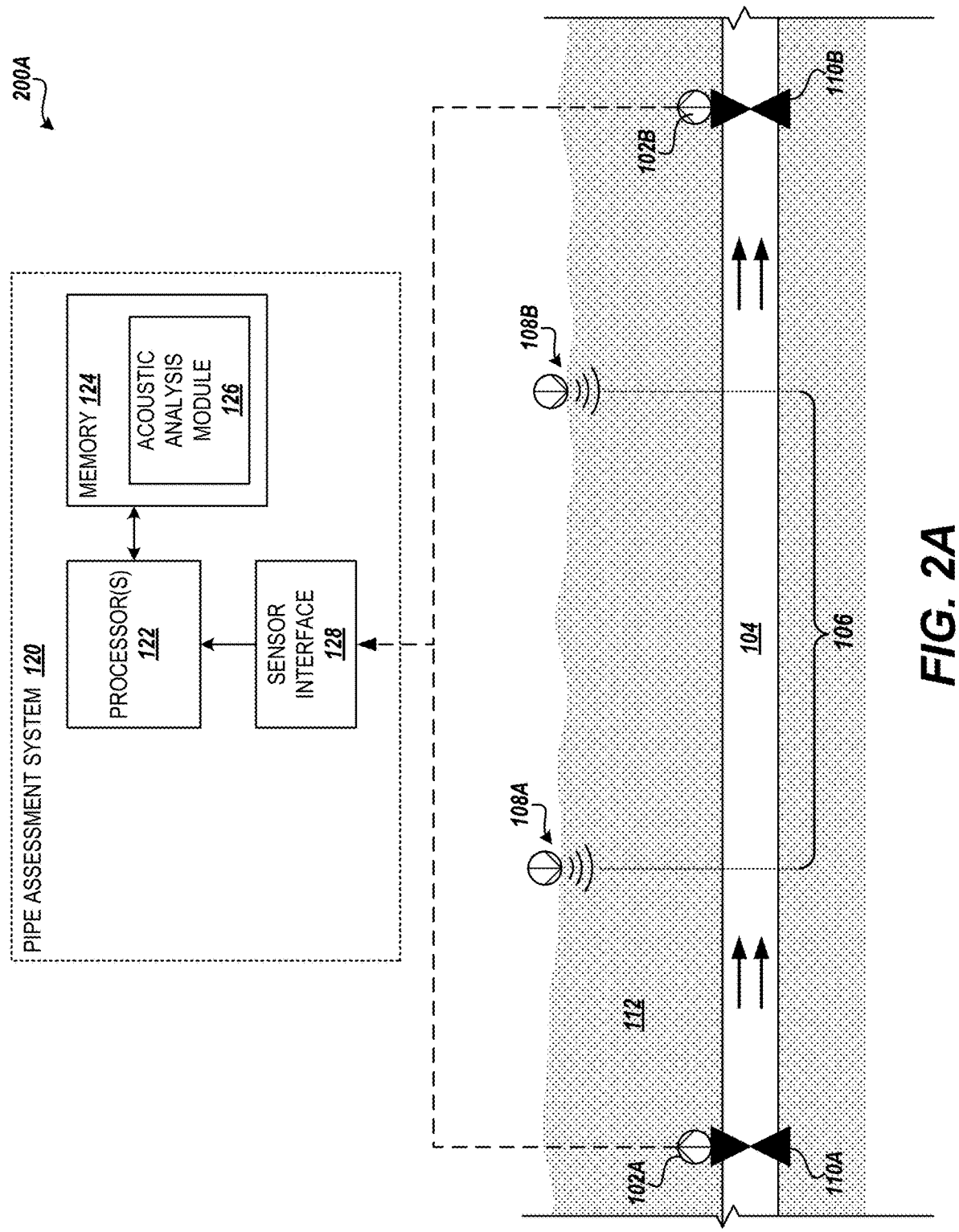
FIGS. 2A-2C are block diagrams showing illustrative environments for the implementation of the embodiments described herein for performing high-resolution assessment of the condition of pipes of a fluid distribution system, including utilizing in-bracket and/or out-of-bracket excitation of the pipes in multiple locations.
Figure 2B:
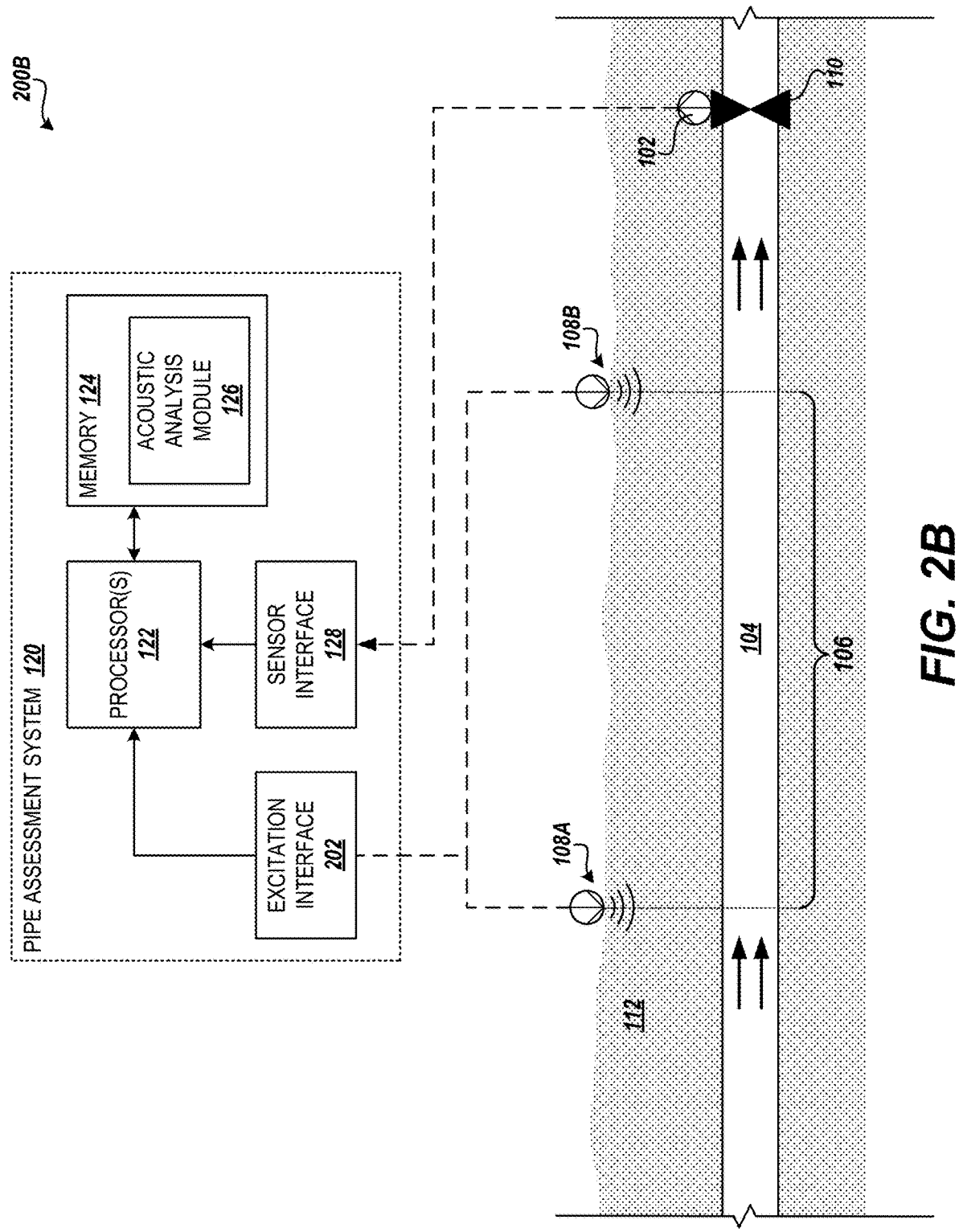
Figure 2C:
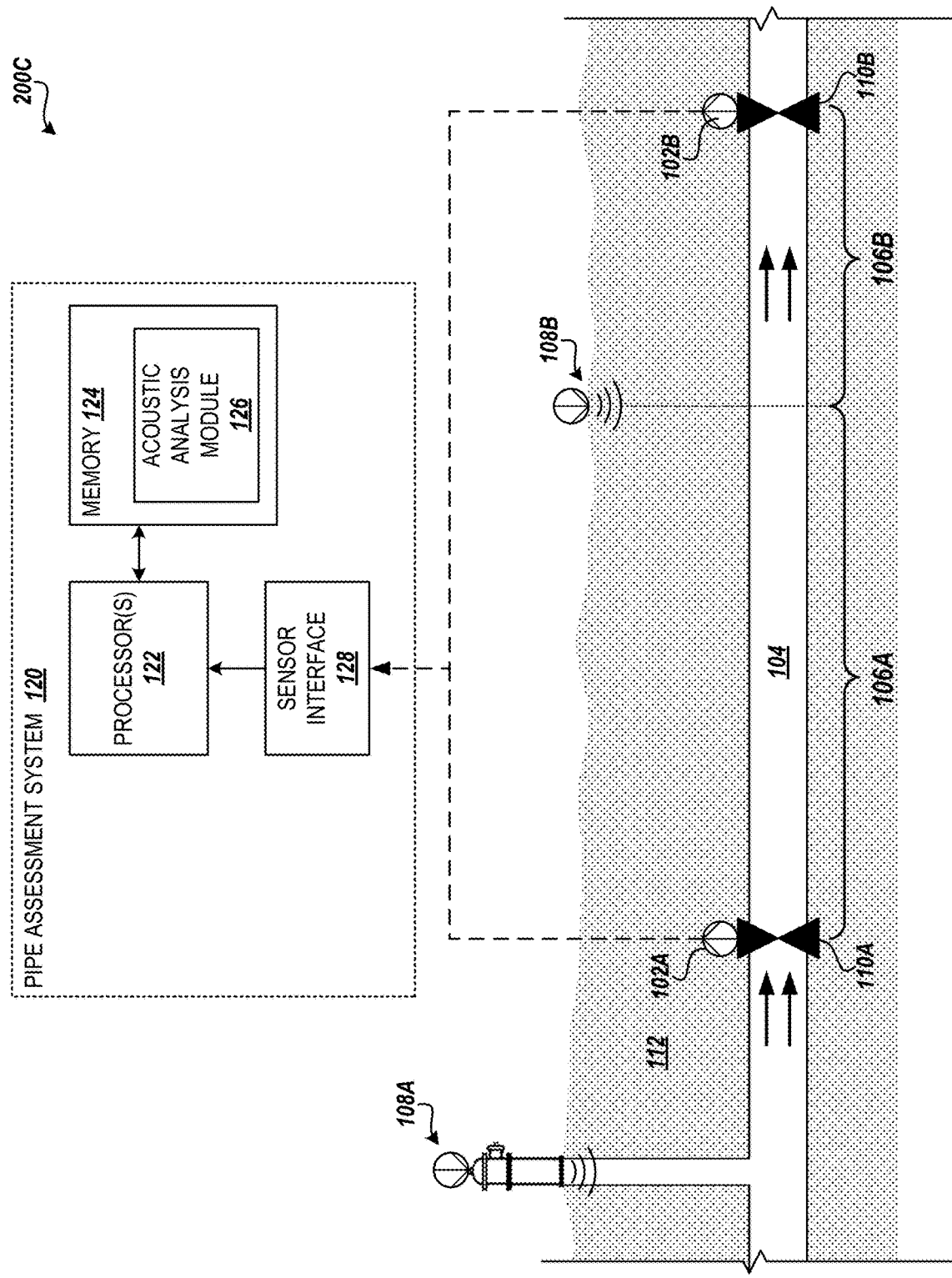

FIGS. 2A-2C and the following description are intended to provide a general description of suitable environments in which the embodiments described herein may be implemented. In particular, FIGS. 2A-2C show environments 200A-200C for assessing the condition, e.g. predicting the stiffness or wall thickness, of a pipe of a fluid distribution system, according to embodiments described herein. As shown in FIG. 2A, one environment 200A includes a pipe 104 containing the pipe section 106 to be tested. According to some embodiments, the pipe 104 may be a main in a water or other fluid distribution system that may include many pipes of various diameters and made of various materials, all connected in a fluid network. The fluid distribution system may further include other distribution system components, such as couplings, valves, hydrants, pumps, and the like. For example, a segment of the pipe 104 containing the target pipe section 106 may be bracketed by valves 110A and 110B (referred to generally as valves 110) installed in the fluid network. As discussed above, the fluid network may be partially or wholly subterranean, or portions of the fluid network may be subterranean, while other portions of the fluid network may be non-subterranean (i.e., above ground). For example, the pipe 104 may be partially or wholly subterranean while valves 110 and other appurtenances, such as hydrants, connected to the pipe may be accessible below ground 112 and/or located above ground.

The environment 200A further includes one or more vibration or acoustic sensors 102, such as acoustic sensors 102A and 102B, in acoustical communication with the pipe 104. According to embodiments, the acoustic sensors 102 may be attached to the pipe 104 or appurtenances thereof at locations easily accessible without the need for excavation of potholes 114 as shown in FIG. 1. For example, the acoustic sensors 102A and 102B may be attached to valves 110A and 110B, respectively, located at either end of a segment of the pipe 104 containing the target pipe section 106 as part of the fluid network. In further embodiments, the acoustic sensors 102 may be attached to an outer wall of the pipe 104 at locations where the pipe is easily accessible, such as locations where the pipe is above ground 112 or where a pothole or pit is already in place, or attached to above-ground appurtenances, such as fire hydrants or service valves.

According to embodiments, sound may be generated in the pipe 104 at two or more in-bracket locations, i.e., between the locations of the acoustic sensors 102A and 102B bracketing the segment of the pipe 104 containing the target pipe section, as shown at 108A and 108B in FIG. 2. In some embodiments, the sound may comprises a series of acoustical impulses, i.e., a vibrations or longitudinal pressure waves, generated in the fluid path of the pipe 104. The acoustical impulses may be generated by any means suitable for the creation of acoustical impulses or vibrations in the pipe 104, including a manually actuated device, such as a human with a hammer, a mechanical device, such as a motorized hammer or piston, an electro-mechanical device, such as a speaker or hydrophone, and the like.

In preferred embodiments, the acoustical impulses may be generated by striking the ground 112 at the desired location above the crown of the pipe 104 with a hammer, piston, or other impact device (referred to herein as "ground-pounding"). A block of wood or other suitable material may be laid on top of the ground 112 and impacted upon to ensure that sufficient acoustic energy is transmitted through the ground to the pipe 104 as well as to minimize damage to the ground surface. The ground-pounding method of excitation has the advantage of allowing excitation of the pipe 104 to be performed at any location along the subterraneous pipe segment between the acoustic sensors 102A and 102B based on the section(s) 106 of the pipe targeted for testing, without requiring physical access to the pipe wall, e.g., by way of a pothole 114, or an above-ground appurtenance by which to introduce acoustical impulses into the pipe.

Alternatively, excitation of the pipe 104 can occur through tapping of an outer wall of the pipe 104 at a location where the pipe is above ground 112 or where access to the pipe is facilitated by existing potholes or pits, or by tapping on existing appurtenances, such as a fire hydrant or service valve, where available. In further embodiments, a valve in the fluid path of the pipe segment bracketed by the acoustic sensors 102A and 102B may be opened and closed one or more times so as to generate an acoustical impulses within the pipe segment. It will be understood that many other techniques may be implemented to cause the acoustical impulses to be generated in the pipe 104.

The acoustic sensors 102 measure the sound pressure of the acoustical impulses propagating through the pipe 104. In some embodiments, the acoustic sensors 102 may comprise transducers or accelerometers attached to the valve 110 or other component in fluid communication with the pipe 104, or directly to the outer wall of the pipe 104. The transducers or accelerometers may measure the instantaneous acceleration of the valve or pipe wall from vibrations caused by the sound pressure of the acoustical impulses. The measured acceleration of the wall constitutes an indirect measurement of sound pressure in the pipe 104. In further embodiments, the acoustic sensors 102 may include hydrophones, transducers, accelerometers, or any combination of these and other sensors known in the art for measuring vibrations or acoustic signals.

The acoustic sensors 102 each produce a signal representing the sensed acoustical impulses, and signal data representing the sensed signal from the respective acoustic sensors 102A and 102B are sent to the pipe assessment system 120. The pipe assessment system 120 processes and analyzes the signal data received from the acoustic sensors 102A and 102B to determine a condition of the target pipe section 106 utilizing the methods and technologies described herein. Generally, the pipe assessment system 120 represents a collection of computing resources for the processing and analysis of the signal data received from the acoustic sensors 102 and determination pipe condition. According to embodiments, the pipe assessment system 120 may comprise one or more computer devices and/or computing resources connected together utilizing any number of connection methods known in the art. For example, the pipe assessment system 120 may comprise a mobile computer device, such as a laptop or tablet, deployed in the field in proximity to the target pipe section 106. Alternatively or additionally, the pipe assessment system 120 may comprise laptop or desktop computers; tablets, smartphones or mobile devices; server computers hosting application services, web services, database services, file storage services, and the like; and virtualized, cloud-based computing resources, such as processing resources, storage resources, and the like, that receive the signal data from the acoustic sensors 102 through one or more intermediate communication links or networks.

According to embodiments, the pipe assessment system 120 includes one or more processor(s) 122. The processor(s)

122 may comprise microprocessors, microcontrollers, cloud-based processing resources, or other processing resources capable executing instructions and routines stored in a connected memory 124. The memory 124 may comprise a variety non-transitory computer-readable storage media for storing processor-executable instructions, data structures and other information within the pipe assessment system 120, including volatile and non-volatile, removable and non-removable storage media implemented in any method or technology, such as RAM; ROM; FLASH memory, solid-state disk ("SSD") drives, or other solid-state memory technology; compact disc ROM ("CD-ROM"), digital versatile disk ("DVD"), or other optical storage; magnetic hard disk drives ("HDD"), hybrid solid-state and magnetic disk ("SSHD") drives, magnetic tape, magnetic cassette, or other magnetic storage devices; and the like.

In some embodiments, the memory 124 may include an acoustic analysis module 126 for performing the acoustic analysis of the signal data from the acoustic sensors 102A and 102B to perform high-resolution assessment of the condition of pipes, as described herein. The acoustic analysis module 126 may include one or more software programs, components, and/or modules executing on the processor(s) 122 of the pipe assessment system 120. The acoustic analysis module 126 may further include hardware components specifically designed to perform one or more steps of the routines described herein. According to further embodiments, the memory 124 may store processor-executable instructions that, when executed by the processor(s) 122, perform some or all of the steps of the routine 500 described herein for providing high-resolution assessment of the condition of pipes, as described in regard to FIG. 5.

The pipe assessment system 120 may be in direct communication with the acoustic sensors 102 over a wired connection, or may be indirectly connected to the sensors and impulse generator through one or more intermediate communication links and/or computing devices. For example, a laptop may be connected to the acoustic sensors 102A and 102B via one or more radio-frequency ("RF") links to receive signal data from the sensors in real-time. In other embodiments, the signal data from each acoustic sensor 102 may be received by an individual computing device (referred to as a "node") and sent to a central analysis computer for processing and analysis. In such embodiments, it may be necessary to ensure that the clocks of the individual nodes are synchronized or share a highly-accurate time source in order to ensure accurate timing accompanies the signal data from the respective acoustic sensors 102.

According to some embodiments, the processor(s) 122 are operatively connected to acoustic sensors 102 through a sensor interface 128. The sensor interface 128 allows the processor(s) 122 to receive the signals from the sensors representative of the sensed acoustical impulses in the pipe 104. For example, the sensor interface 128 may utilize one or more analog-to-digital converters ("ADCs") to convert an analog voltage output of the acoustic sensors 102 to a digital value that is sampled by the processor(s) 122 at a specific sampling rate sufficient to represent the acoustical impulses in the signal data. According to some embodiments, a sampling rate around 10 kHz may be utilized to capture data representing the frequencies of interest in the acoustical impulses. In further embodiments, a sound processing unit or "sound card" of the laptop computer may be utilized to provide the sampling functionality.

It will be appreciated that the structure and/or functionality of the pipe assessment system 120 may be different than that illustrated in FIG. 2A and described herein. For example, one or more of the processor(s) 122, memory 124, sensor interfaces 128, and/or other components and circuitry described may be integrated within a common integrated circuit package or distributed among multiple integrated circuit packages in one or more computing devices. In some embodiments, some or all of the processing and analysis described herein may be implemented as software applications on mobile computing platforms, such as a smartphone or laptop with cellular networking capability. Similarly, the illustrated connection pathways are provided for purposes of illustration and not of limitation, and some components and/or interconnections may be omitted for purposes of clarity. It will be further appreciated that pipe assessment system 120 may not include all of the components shown in FIG. 2A, may include other components that are not explicitly shown in FIG. 2A, or may utilize architectures completely different than those shown in FIG. 2A.

Figure 3:
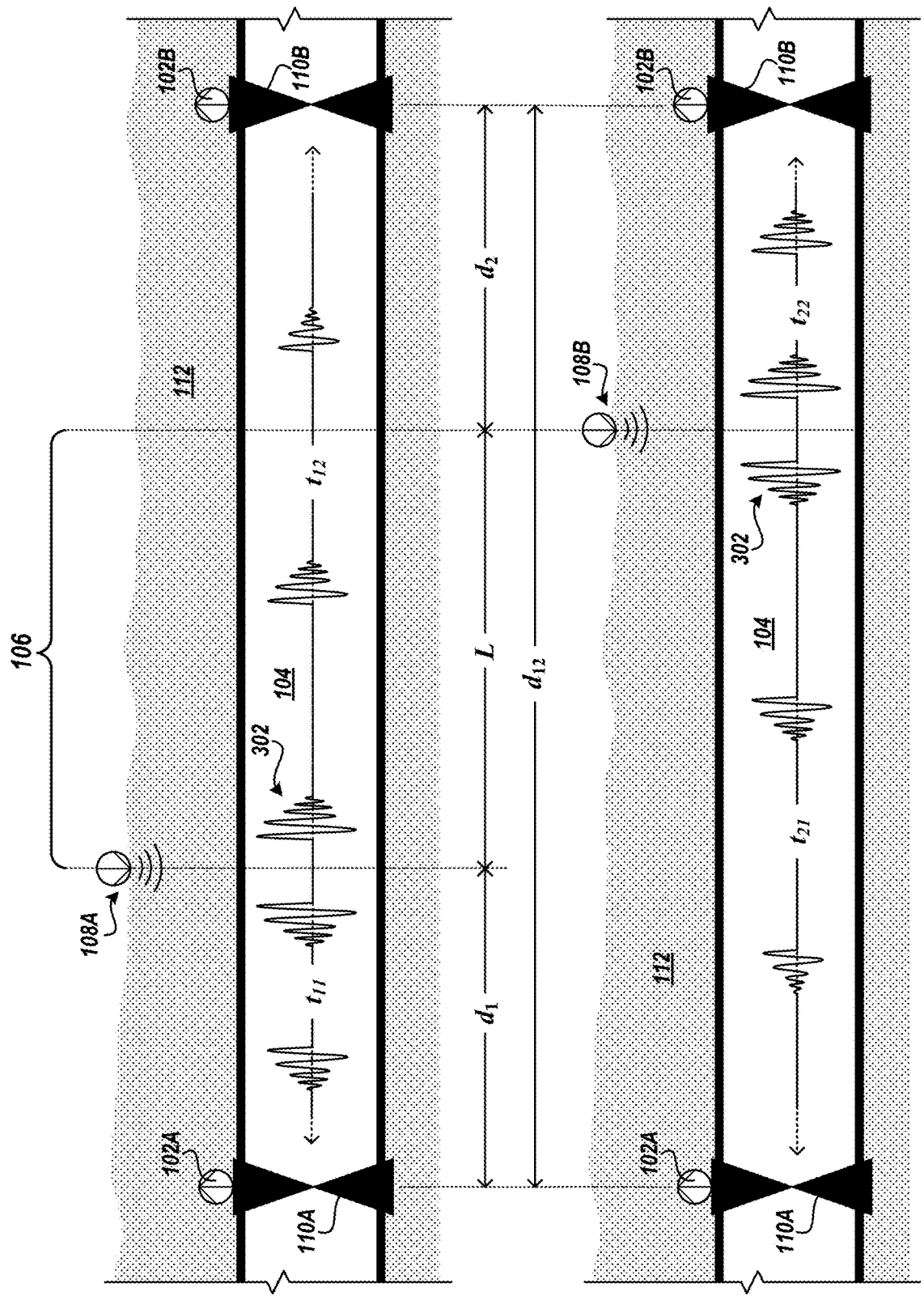
FIG. 3 is a sectional view showing a cross-section in the longitudinal direction of a pipe showing additional details of the propagation acoustical impulses within the pipe section from "ground-pounding" above the pipe in multiple in-bracket locations, according to embodiments presented herein.

FIG. 3 shows additional details of the generation of acoustical impulses in the pipe 104 of a fluid distribution system and estimating a timing delay in traversal of the impulses through the pipe and/or fluid contained therein to the two acoustic sensors 102A and 102B utilizing the system 200 shown in FIG. 2A. According to embodiments, assessment of the condition of a target pipe section 106 in a segment of the pipe 104 bracketed by the two acoustic sensors 102A and 102B comprises excitation of the pipe 104 at two or more in-bracket locations, such as locations 108A and 108B (referred to herein generally as excitation locations 108). The excitations may be performed by ground pounding above the crown of the subterranean pipe 104 at specific locations, for example. Acoustical impulses 302 generated in the pipe 104 at the first location 108A travel down the length of the pipe in both directions from the point of excitation and arrive at the first acoustic sensor 102A in time $t_{11}$ and at the second acoustic sensor 102B in time $t_{12}$. The acoustical impulses 302 are sensed by the acoustic sensors 120A and 102B and the resulting signal data is recorded. The pipe is then excited at the second location 108B and the resulting acoustical impulses 302 travel down the pipe 104, arriving at the first acoustic sensor 102A in time $t_{21}$ and at the second acoustic sensor 102B in time $t_{22}$. Again, the associated signal data from the acoustic sensors 120A and 102B is recorded.

The information regarding the location along the pipe segment of the acoustic sensors 102A and 102B as well as the specific, in-bracket excitation locations 108A and 108B is provided to or know by the pipe assessment system 120. From the location information, the distance from the first excitation location 108A to the first acoustic sensor 102A, denoted $d_1$, the distance from the second excitation location 108B to the second acoustic sensor 102B, denoted $d_2$, and the distance between the two excitation locations, denoted L, may be determined. Here L further represents the length of the pipe section 106 under test, with the excitation locations 108A and 108B encompassing the section. It will be appreciated that the total distance $d_{12}$ between the two acoustic sensors 102A and 102B will equal the sum of these distances, i.e.:

$$d_{12}=d_1+d_2+L$$

It will be appreciated that if one or more of the acoustic sensors 102 are placed on appurtenances connected by a lateral or riser to the pipe 204, such as an above-ground hydrant connected to the pipe by a riser, then the length of the lateral or riser must be included in the lengths $d_1$, $d_2$, and L utilized in these equations.

The propagation times of the acoustical impulses 302 from the first excitation location 108A to the acoustic sensors 102A and 102B may be expressed as follows:

$$t_{11} = \frac{d_1}{c_1} \quad t_{12} = \frac{L}{c} + \frac{d_2}{c_2}$$

where $c_1$ represents the acoustical propagation velocity in the section pipe of pipe between the first excitation location 108A and the first acoustic sensor 102A, where $c_2$ represents the acoustical propagation velocity in the section pipe of pipe between the second excitation location 108B and the second acoustic sensor 102B, and c represents the acoustical propagation velocity in the target pipe section 106. In a similar fashion, propagation times of the acoustical impulses 302 from the second excitation location 108B to the acoustic sensors 102A and 102B may be expressed as follows:

$$t_{21} = \frac{L}{c} + \frac{d_1}{c_1} \quad t_{22} = \frac{d_2}{c_2}$$

The specific propagation times of the impulses 302 down the relevant sections of the pipe 104 may not be measurable from the recorded signal data without precise timing information regarding the excitations at the two locations being available. However, the pipe assessment system 120 may compute a time delay, designated Δt, between the arrival of the generated acoustical impulses from a specific excitation location 108 at the acoustic sensors 102A and 102B by extracting precise timing information regarding the impulses from the signal data. For example, the pipe assessment system 120 may employ the signal processing methods described in co-owned U.S. patent application Ser. No. 16/935,945, filed Jul. 22, 2020, and incorporated herein in its entirety by this reference, to make precise estimates of the time delays $\Delta t_1$ and $\Delta t_2$ related to the excitations at the first location 108A and second locations 108B, respectively from the associated signal data.

It will be further appreciated that the time delays $\Delta t_1$ and $\Delta t_2$ are related to the distances provided above as follows:

$$\Delta t_1 = t_{12} - t_{11} = \frac{L}{c} + \frac{d_2}{c_2} - \frac{d_1}{c_1}$$

$$\Delta t_2 = t_{22} - t_{21} = \frac{d_2}{c_2} - \frac{L}{c} - \frac{d_1}{c_1}$$

The difference between these two measured time delays can further be related to the acoustical propagation velocity c in the target pipe section 106 as follows:

$$\Delta t_1 - \Delta t_2 = \left(\frac{L}{c} + \frac{d_2}{c_2} - \frac{d_1}{c_1}\right) - \left(\frac{d_2}{c_2} - \frac{L}{c} - \frac{d_1}{c_1}\right) = 2\frac{L}{c}$$

or:

$$c = 2\frac{L}{\Delta t_1 - \Delta t_2}$$

Thus the pipe assessment system 120 can determine the acoustical propagation velocity c in the target pipe section 106 of length L from the two estimates of the time delays $\Delta t_1$ and $\Delta t_2$ computed from the signal data recorded at the acoustic sensors 102A and 102B during the excitations of the pipe at the two in-bracket locations 108A and 108B, respectively. The pipe assessment system 120 may then utilize the determined acoustical propagation velocity c to assess the condition of the target pipe section 106, utilizing any of the methods described by the disclosure(s) incorporated herein. Utilizing this method of exciting the pipe 104 at two in-bracket locations to measure the acoustical propagation velocity in the target pipe section 106 is much more flexible than the traditional method shown in FIG. 1, because the acoustic sensors 102A and 102B can be placed at any convenient, accessible locations on the segment of the pipe 104 containing the target pipe section 106, the position of and distance between the acoustic sensors not being determinative to the pipe section being assessed. The excitation locations 108A and 108B may be selected based on the desired target pipe section(s) 106 instead having to find locations of potholes or pits where the pipe is accessible.

As may be seen in the discussion above, calculating the acoustical propagation velocity in the target pipe section requires two timing references, as provided by the two acoustic sensors 102A and 102B shown in FIG. 2A. In further embodiments, a single sensor 102 may be utilized by the pipe assessment system 120 if timing information for the generation of the impulses at the excitation locations can also be obtained. For example, as shown in environment 200B of FIG. 2B, acoustical impulses may be generated at excitation locations 108A and 108B by means of a motorized hammer or piston or a speaker or hydrophone controlled by the pipe assessment system 120 through an excitation interface 202. The excitation interface 202 may allow the processor(s) 122 to control the generation of acoustical impulses by mechanical or electro-mechanical devices at the excitation locations 108. The excitation interface 202 may further allow the processor(s) 122 to receive precise timing information for the generation of the impulses at each excitation location 108 during recording of the signal(s) from the sensor 102. In further embodiments, the timing information for the generation of impulses by ground pounding or other manual means may be obtained by the pipe assessment system 120 through sensors placed on the ground at each excitation location 108 and connected to the excitation interface 202.

Utilizing a similar methodology to that described above in regard to FIG. 3, the pipe assessment system 120 may utilize the recordings from the single acoustic sensor 102 and the timing information for the generation of the impulses at each location to determine the respective propagation times of the acoustical impulses 302 from the two excitation location 108A and 108B to the sensor, and thus calculate acoustical propagation velocity c in the target pipe section 106. The pipe assessment system 120 may then utilize the calculated acoustical propagation velocity c to assess the condition of the target pipe section 106. However, the calculation of acoustical propagation velocity in the target pipe section 106 using the mechanisms of environment 200B may suffer from errors introduced by propagation of the acoustical impulses from the excitation locations 108 through the ground 112 and to the pipe 104. These errors may be minimized by ensuring excitation at locations 108 of similar soil condition and pipe depth. Adding the second acoustic sensor 102 as shown in FIG. 2A eliminates this error as well as the need for collection of precise timing information for the generation of the impulses at each excitation location 108, but requires another sensor be placed in acoustical communication with the pipe at some point outside of the target pipe section 106.

In further embodiments, out-of-bracket excitation location(s) 108 may be utilized along with one or more in-bracket excitation locations for the generation of acoustical impulses 302 in the pipe 104 for assessment of the condition of the target pipe section 106. This may be desired where convenient locations for excitation of the pipe 104 exist out-of-bracket of the pipe segment encompassed by the two acoustic sensors 102A and 102B, such as an exposed section of the pipe, an above ground appurtenance, or the like. For example, as shown in environment 200C of FIG. 2C, acoustical impulses may be generated at both in-bracket excitation location 108B and out-of-bracket excitation location 108A. Utilizing the same algorithms to that described above in FIG. 3, the time delays $\Delta t_1$ and $\Delta t_2$ may be computed by the pipe assessment system 120 from the signal data recorded at the acoustic sensors 102A and 102B during the excitations of the pipe at the excitation locations 108A and 108B, respectively. The pipe assessment system 120 may then determine the acoustical propagation velocity c in the target pipe section 106A comprising the section of pipe between the first sensor 102A and the location 108B of the in-bracket excitation from the two estimates of the time delays. From the acoustical propagation velocity c in the target pipe section 106A, the pipe assessment system 120 may then determine the condition of the pipe section. In addition, the acoustical propagation velocity c in the target pipe section 106B comprising the section of pipe between the in-bracket excitation location 108B and the second sensor 102B may also be determined, allowing the pipe assessment system 120 to determine independently the condition of that pipe section.

It will be appreciated that the methodologies described herein allow higher resolution assessment of the condition of a pipe 104 to be performed by targeting multiple, independent pipe sections 106 of a pipe segment bracketed by two acoustic sensors 102A and 102B. The position and length of the target pipe sections 106 along the pipe 104 is determined by the excitation locations 108, which can be any reasonable above-ground location, while the acoustic sensors 102A and 102B bracketing the pipe segment containing the target section(s) may be located at any convenient location where placing the sensors in acoustical communication with the pipe is practical. For example, as shown in FIG. 4, the independent condition of target pipe sections 106A-106D along the segment of the pipe 104 bracketed by acoustic sensors 102A and 102B may be determined by ground-pounding at multiple excitation locations 108A-108E while the signal data from the acoustic sensors 102A and 102B is recorded.

Figure 4:
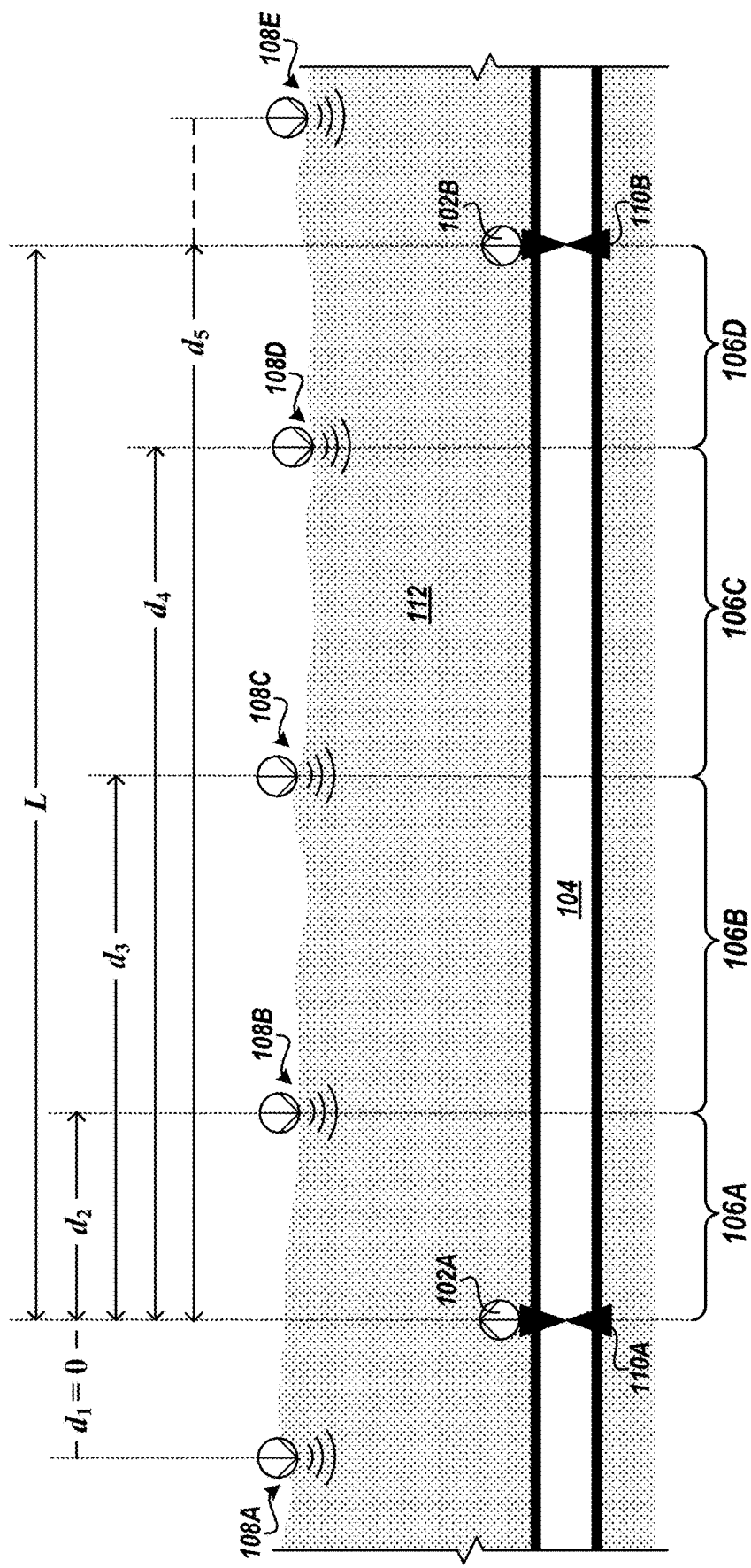
FIG. 4 is a sectional view showing additional details of utilizing ground-pounding above the pipe in multiple in-bracket and out-of-bracket locations to assess pipe condition in multiple target sections of the pipe, according to embodiments presented herein.

As denoted in FIG. 4, if $d_x$ represents the distance of the $x^{th}$ respective excitation location 108A-108E from the first acoustic sensor, then the acoustical propagation velocity in each of the target pipe sections 106A-106D may be computed by the pipe assessment system 120 by determining estimates for the time delays between the arrival of acoustical impulses at the two acoustic sensors 102A and 102B for excitation of the pipe at each of the locations 108A-108E from the recorded signal data, and then applying the following equations:

$$c_1 = 2\frac{d_2 - d_1}{(\Delta t_1 - \Delta t_2)}$$

$$c_2 = 2\frac{d_3 - d_2}{(\Delta t_2 - \Delta t_3)}$$

-continued $$c_3 = 2\frac{d_4 - d_3}{(\Delta t_3 - \Delta t_4)}$$

$$c_4 = 2\frac{d_5 - d_4}{(\Delta t_4 - \Delta t_5)}$$

where $\Delta t_x$ represents the time delay between the arrival of acoustical impulses at the acoustic sensors associated with excitation of the pipe at the $x^{th}$ excitation location and $c_1$, $c_2$, $c_3$, and $c_4$ represent the acoustical propagation velocity in the pipe sections 106A, 106B, 106C, and 106D, respectively. Where out-of-bracket excitation location(s), such as locations 108A and 108E, are used in conjunction with one or more in-bracket excitation locations, such as 108B-108D, the value used for the distance $d_1$ associated with the first, out-of-bracket excitation location 108A will be zero (i.e., $d_1 = 0$), while the value used for the distance $d_5$ associated with the last, out-of-bracket excitation location 108E will be the distance between the two acoustic sensors 102A and 102B (i.e., $d_5 = L$).

Utilizing the speeds of sound calculated for each target pipe section 106A-106D, the condition of each target section can be determined individually. The number and length of the target pipe sections 106 for condition assessment is basically limited by the number of excitation locations used within the segment of pipe 104 bracketed by the acoustic sensors 102A and 102B. However, according to some embodiments, a practical minimum length of a target pipe section 106 may be on the order of 10-30 m, depending on the material and diameter of the pipe 104, and the length of each target pipe section need not be the same.

Figure 5:
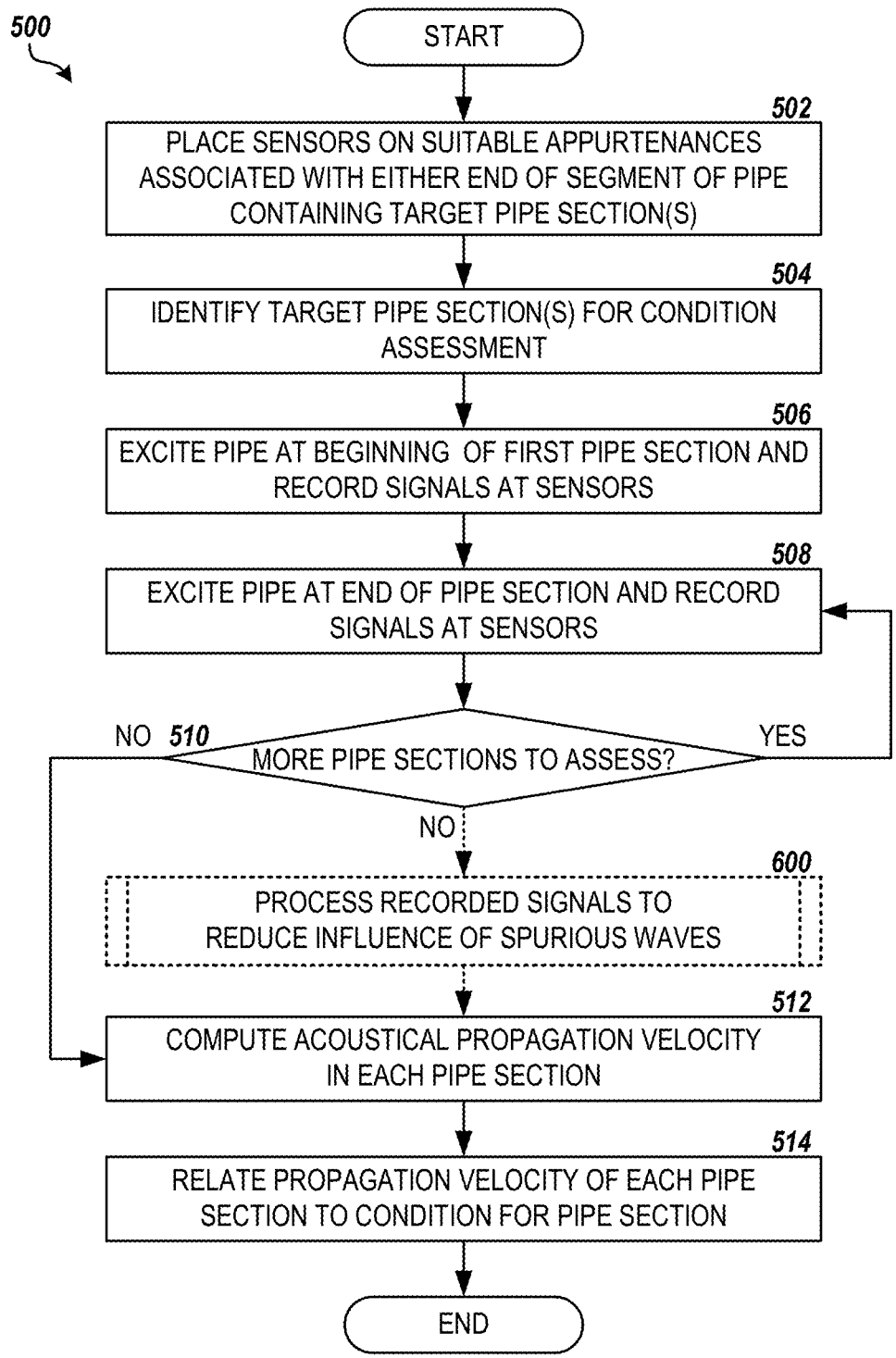
FIG. 5 is a flow diagram showing one routine for assessing the condition of section(s) of a pipe in a fluid distribution system by in-bracket and/or out-of-bracket excitation of the pipes in multiple locations, according to embodiments presented herein.

FIG. 5 illustrates one routine 500 for assessing the condition of a pipe section of a fluid distribution system by in-bracket and, potentially, out-of-bracket excitation of the pipes in multiple locations, according to some embodiments. In some embodiments, parts of the routine 500 may be performed by the acoustic analysis module 126 executing on a laptop computer in direct connection with acoustic sensors 102A and 102B associated with the target pipe section 106. In other embodiments, the routine 500 may be performed by some combination of the processor(s) 122, computing devices, components, and modules of the pipe assessment system 120 in conjunction with parameters, data, and/or instructions provided with maintenance personnel associated with the fluid distribution system.

The routine 500 begins at step 502, where a segment of a pipe 104 in a fluid distribution system containing one or more pipe sections 106 for condition assessment is identified. Acoustic sensors 102A and 102B are then placed at either end of the segment of pipe, on an exposed section of the pipe and/or readily accessible appurtenances, such as valves 110, hydrants, or the like. The acoustic sensors 102A and 102B are connected to the pipe assessment system 120. As described above, one or more of the acoustic sensors 102A and 102B may be connected directly to the pipe assessment system 120, either wirelessly or wired, or the acoustic sensors may be indirectly connected to the pipe assessment system through one or more intermediate computing devices or nodes connected to the pipe assessment system via a network.

According to some embodiments, one or more of the acoustic sensors 102 may already be in place, attached to the pipe 104, valves 110, or hydrants as part of a leak detection and condition monitoring system for the fluid distribution system. In further embodiments, the fluid distribution system may be a served by a GIS or geospatial mapping system that contains the locations of all pipes, valves, hydrants, meters, etc. in the fluid distribution system. The GIS or geospatial mapping system may allow the selection of the segment of the pipe 104 to be bracketed by the acoustic sensors 102A and 102B, the appurtenances bracketing the segment of pipe to which to attach the sensors, the target pipe section 106 or sub-sections 402 for which condition assessment is desired, the associated excitation locations 108 along the segment of the pipe at which to perform ground pounding, and the like. From these selections, parameters such as lengths of the target pipe section 106 or sub-sections 402, distances from the acoustic sensors 102A and 102B to the excitation locations 108, precise GPS coordinates of excitation locations, and the like can be provided to the pipe assessment system 120 and/or field personnel performing the condition assessment(s), as described herein.

Next, the routine 500 proceeds from step 502 to step 504, where the target pipe section(s) 106 for condition assessment is identified. According to embodiments, the target pipe section(s) 106 must be contained within the segment of the pipe 104 bracketed by the acoustic sensors 102A and 102B, and may include the entire segment of pipe or portion(s) thereof. In some embodiments, the target pipe section(s) 106 may be selected in the GIS or geospatial mapping system described above, with the length of the section and GPS coordinates of the ends of the sections provided to the pipe assessment system 120 and/or field personnel performing the condition assessment. Any number and length of target pipe section(s) 106 may be identified for condition assessment based on a number of factors, including the required resolution of testing, the length of the target pipe section 106, a minimum testable length of a section based on signal propagation limitations and processing methods, the pipe configuration, a likelihood of variation in condition across the target pipe section, the accessibility of excitation locations 108 along the target pipe section, and the like. It will be appreciated that the selected target pipe section(s) 106 may both determine and depend upon the corresponding excitation locations 108, as described above. Determining acoustical propagation velocity for a number of target pipe sections 106 using multiple, adaptable excitation locations 108 with the same two acoustic sensors 102 results in a flexible and higher-resolution assessment of the condition of the pipe than would be otherwise obtained from conventional methods.

The routine 500 proceeds from step 504 to step 506, where the excitation of the pipe 104 at a first excitation location 108A is performed while signal data from the two acoustic sensors 102A and 102B is recorded by the pipe assessment system 120. According to embodiments, the first excitation location 108A may be located at a location along the pipe 104 at the beginning of the first target pipe section 106A for condition assessment. In some embodiments, where the first target pipe section 106A begins substantially at the location of the first acoustic sensor 102A, then the first excitation location 108A may be out-of-bracket at some arbitrary distance from the first sensor, such as location 108A shown in FIG. 4. Excitation of the pipe 104 at this first location 108A may be performed by pounding the ground above the crown of the pipe using a hammer or other impact device. This allows excitation at the location 108A without the need for direct access to the pipe wall or an exposed appurtenance.

From step 506, the routine 500 proceeds to step 508, where excitation of the pipe 104 is performed at a second excitation location 108B at the end of the first target pipe section 106A while signal data from the two acoustic sensors 102A and 102B is recorded by the pipe assessment system 120. As shown at step 510, the excitation process is repeated for excitation locations 108 located at or over the end of each additional target pipe section 106 identified for condition assessment in step 504 while corresponding signal recordings are made from the two acoustic sensors 102A and 102B. For example, as shown in FIG. 4, the process of step 508 may be repeated three (3) more times at excitation locations 108C, 108D, and 108E at the ends of target pipe sections 106B, 106C, and 106D, respectively, while signal data from the two acoustic sensors 102A and 102B is recorded by the pipe assessment system 120 during each excitation. In some embodiments, where the last target pipe section 106D ends substantially at the location of the second acoustic sensor 102B, then the last excitation location 108E may be out-of-bracket at some arbitrary distance from the second sensor, as further shown in FIG. 4.

The routine proceeds from step 510 to step 512, where the pipe assessment system 120 utilizes the signals recorded at acoustic sensors 102A and 102B corresponding to each excitation to determine the acoustical propagation velocity within each target pipe section 106. For example, the pipe assessment system 120 may utilize the signal recordings from acoustic sensors 102A and 102B taken during the excitation at location 108A to compute the time delay $\Delta t_1$ between the arrivals of acoustical impulses at the two sensors. Similarly, the pipe assessment system 120 may utilize the recorded signals corresponding to the excitations at locations 108B, 108C, 108D, and 108E to compute the time delays $\Delta t_2$, $\Delta t_3$, $\Delta t_4$, and $\Delta t_5$, respectively. From the computed time delays $\Delta t_1$, $\Delta t_2$, $\Delta t_3$, $\Delta t_4$, and $\Delta t_5$ and the known distances $d_1$, $d_2$, $d_3$, $d_4$, and $d_5$ of the respective excitation locations 108A, 108B, 108C, 108D, and 108E from the first acoustic sensor 102A, the pipe assessment system 120 may then calculate acoustical propagation velocities $c_1$, $c_2$, $c_3$, and $c_4$ associated with the target pipe sections 106A, 106B, 106C, and 106D, respectively, utilizing the equations described above in regard to FIG. 4.

The routine 500 then proceeds from step 512 to step 514, where the pipe assessment system 120 associates the acoustical propagation velocities computed for the target pipe section(s) 106 with a condition of the pipe in each section. For example, the acoustical propagation velocity computed for the target pipe section 106 may be compared with a reference speed of sound for that specific pipe class and material, with any differences used to determine the condition of the section. From step 514, the routine 500 ends. It will be appreciated that the steps of the routine 500 shown in FIG. 5 and described herein may be performed in any order. For example, the condition assessment routine 500 may include the pipe assessment system 120 calculating the delays from the recorded signals corresponding to two or more excitation locations 108 and/or the propagation velocity in one or more target pipe sections 106 before returning to step 508 to perform excitation at a new location while recording new signals at the acoustic sensors 102. Further, after determination of the condition of one or more target pipe sections 106, additional pipe sections may be targeted leading to additional excitation locations and recordings to achieve a higher resolution of condition assessment. It is intended that all such variations in the order of the steps of the routine 500 be included in this application.

It will be further appreciated that, in order to precisely compute the acoustical propagation velocities in each target pipe section 106, the pipe assessment system 120 must be able to consistently identify the time of arrival of the acoustical impulses generated by the excitations at the two acoustic sensors 102A and 102B in the respective signal recordings. According to embodiments, the condition of a pipe 104 is best reflected by the propagation velocity of a coupled axisymmetric wave conventionally named L(0,1). This is a predominantly fluid borne wave and is the dominant mode in low frequency vibrations (e.g., below 1000 Hz) that propagate over long distances in buried water-mains. However, the excitation of the pipe 104 through ground-pounding or other impact methods generally induces multiple modes of vibration in the pipe structure, such as an axisymmetric compressional wave in the shell, the bending wave, and/or other higher order vibration modes. These modes may propagate down the length of the pipe 104 with different velocities, impairing the ability to measure the propagation velocity of the primary acoustic wave of interest.

Generally, these additional modes propagate over short distances, and because traditional acoustic pipe condition assessment is carried out over relatively long distances (typically 100 meters), there may be little interference from these additional modes in the determination of the propagation velocity of the primary, e.g., L(0,1), mode. In the disclosed embodiments, however, where condition assessment is potentially desired in multiple, relatively short sections of pipe, the effect of these additional modes may need to be accounted for. According to some embodiments, before computing the acoustical propagation velocities in each target pipe section 106 at step 512, a routine 600 may be executed in which the pipe assessment system 120 performs pre-processing of the recorded signals recorded from the acoustic sensors 102 in order to reduce or remove the influence of multiple acoustic propagation modes beyond the primary mode of interest (referred to herein as "spurious waves") in the recorded signals. This may allow for more accurate estimation of the time delays between the arrival of the primary mode wave at the two acoustic sensors 102A and 102B, providing more precise determination of the acoustical propagation velocity of the primary wave in the pipe section(s) and thus more accurate condition assessment.

Figure 6:
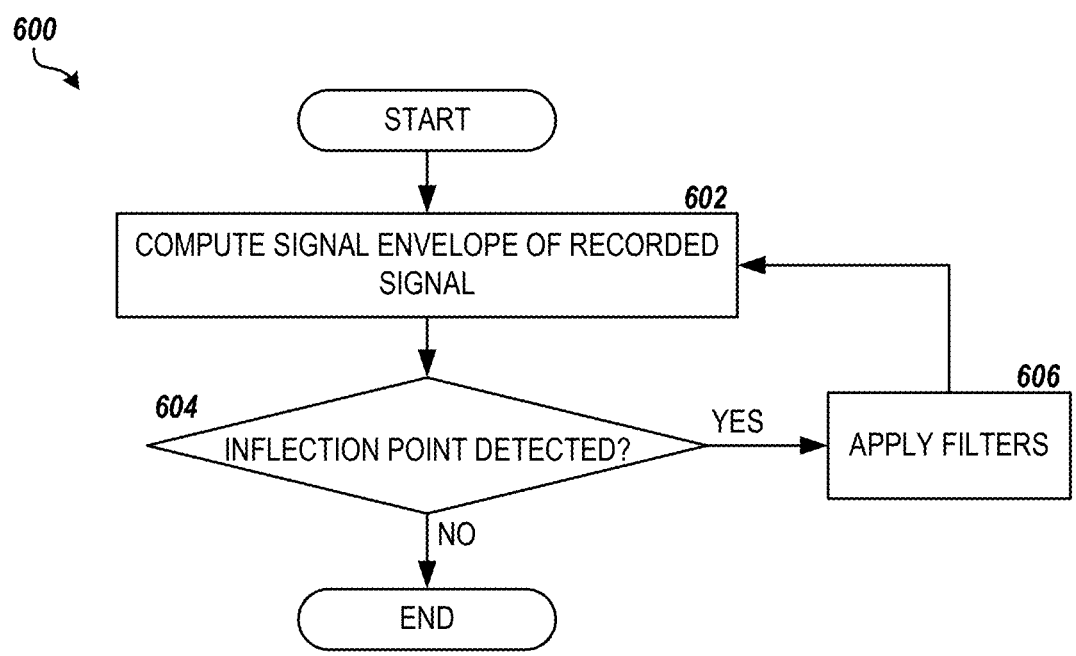
FIG. 6 is a flow diagram showing one routine for detecting and reducing the influence of spurious waves in the recorded signals from the acoustic sensors, according to embodiments presented herein.

FIG. 6 illustrates one example of a routine 600 for detecting and reducing the influence of these spurious waves in the recorded signals from the acoustic sensors 102, according to some embodiments. In some embodiments, the routine 600 may be performed by the acoustic analysis module 126 executing on a laptop computer for each signal recorded from the acoustic sensors 102A and 102B before the computation of the acoustical propagation velocities in each target pipe section 106 described above as part of step 512 of routine 500. In other embodiments, the routine 600 may be performed by some combination of the processor(s) 122, computing devices, components, and modules of the pipe assessment system 120 in conjunction with computations and determination of the condition of the target pipe section(s) 106.

Figure 7:
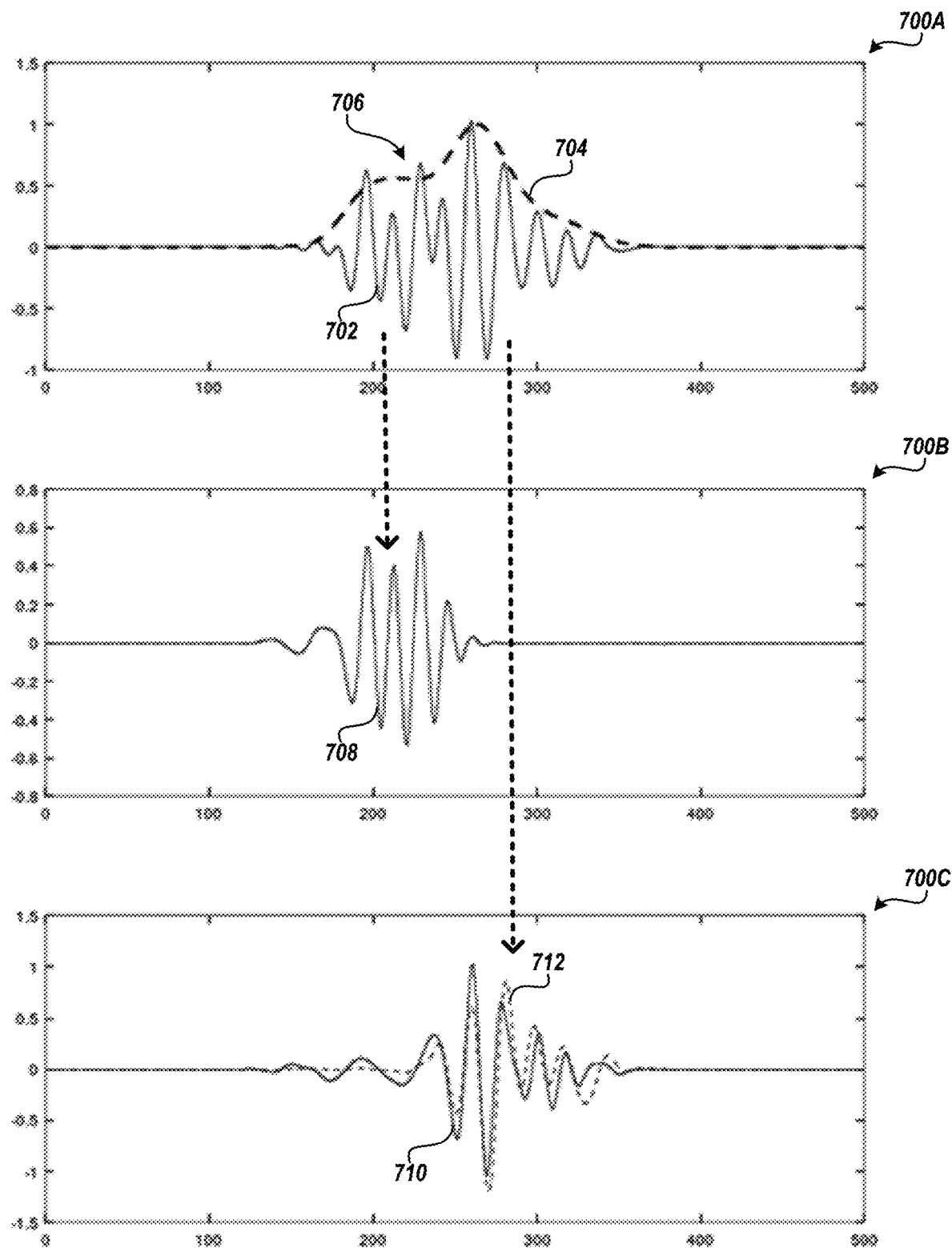
FIG. 7 comprises signal diagrams showing a signal and its decomposition into a primary wave of interest and spurious wave(s), according to embodiments presented herein.

The routine 600 begins at step 602, where the acoustic analysis module 126 calculates a signal envelope for the recorded signal(s). The signal envelope may be computed using the absolute value of a Hilbert transform of the signal, for example. Next, the routine 600 proceeds to step 604, where the acoustic analysis module 126 determines if an "inflection point" is present in the rising edge of the signal envelope. This is a test to determine if multiple waves are present in the signal recorded at the sensor 102. When multiple waves are propagating with different velocities, they may arrive at the sensor 102 at different times. These superimposed signals may create the "inflection point" pattern. This is illustrated in the signal graph of 700A of FIG. 7, where the signal contains multiple modes from the acoustical impulses that have different arrival times at the acoustic sensor 102 due to the different propagation velocities along the pipe. For example, the signal 702 shown in 700A may be the combination of the primary mode or wave of interest, shown at 710 in signal graph 700C, along with a higher mode spurious wave, such as that shown at 708 in signal graph 700B, that arrives at the sensor before the primary wave 710 due to faster propagation velocities. The presence of the additional mode(s) may be indicated by the inflection point 706 in the signal envelope 704 computed from the original signal 702.

According to some embodiments, the presence of the inflection point in the signal envelope may be determined by utilizing the following steps:

1. Identify the rising edge of the signal envelope as the portion between 20% to 80% of the maximum level.
2. Compute finite differences between some number N samples in the rising edge of the signal envelope as a discrete approximation of the signal derivative:

$\Delta x_k = x_k - x_{k-1}, k=1 \ldots N$

3. Compute a median value of the discrete derivative.
4. Compute a minimum value of the discrete derivative.
5. Compute an "inflection ratio" for the rising edge of the signal envelope as a ratio between the minimum and the median values of the discrete derivative:

$$\text{Inflection Ratio} = \frac{\text{Min}(\Delta x_k, k = 1 \ldots N)}{\text{Median}(\Delta x_k, k = 1 \ldots N)}$$

If the inflection ratio computed for the rising edge of the signal envelope 704 is less than the threshold value (e.g., 0.33), then the inflection point 706 is detected, indicating the presence of spurious waves, e.g. wave 708, in the recorded signal 702.

If an inflection point is detected in the signal envelope, then the routine 600 proceeds from step 604 to step 606, where the acoustic analysis module 126 may apply one or more filters to the recorded signal(s) 702 in order to filter out the one or more spurious waves. For example, the acoustic analysis module may apply one or more of pass-band filters, wavelet based filters, or Empirical Mode Decomposition in order to remove the spurious waves 708 from the recorded signal 702.

Pass-Band Filters

The simplest solution consists of applying a pass-band filter tuned to the primary wave (mode) of interest, e.g., 200 Hz to 800 Hz. According to some embodiments, both signals from the two acoustic sensors 102A and 102B are passed through the same finite impulse response (FIR) filter in order to preserve signal phase while removing higher level modes, thus ensuring no additional error is introduced in the computation of the time delay estimations.

Wavelet Filters

As described herein, the spurious waves generally only propagate over short distances relative to the primary wave and thus their effect diminishes quickly as the acoustical impulses propagate down the pipe 104. Accordingly, the signal recorded at the acoustic sensor 102 farthest away from the excitation location 108 (referred to herein as the "far signal") may be considered to not be affected by spurious waves. In this case, the shape of the far signal should be found in the signal recorded at the acoustic sensor 102 closest to the excitation location 108 (referred to herein as the "near signal"). In ideal circumstances, a cross-correlation could be utilized to identify the similar pattern in both signals, and an estimation of the time delay could be extracted from the cross-correlation. However, reflections from pipe appurtenances and signal attenuation may introduce additional errors. In order to identify the localized effect of the spurious wave in the near signal, the acoustic analysis module 126 may utilize wavelet signal decomposition. For example, the acoustic analysis module 126 may utilize a wavelet transform processing comprising the following steps:

1. Compute the cross-correlation of the far and near signals and identify the local maxima in the cross-correlation. Only the values above a certain threshold will be considered. These local maxima correspond to potential time delay estimations.
2. Determine an appropriate mother wavelet. The following factors are considered: similarity between the wavelet and the signal, orthogonality, and energy-to-entropy ratio. For example, a Daubechies wavelet with 8 to 20 filter taps may adequately represent the signals.
3. Compute a Fast Wavelet Transform of the near signal. The result is a sequence of coefficients representing the orthogonal projection of the signal using different scales of the chosen wavelet:

$$P(k) = \sum_{n=1}^{N} x_n^{(J)} \phi(2^J k - n)$$

where x is the signal, ∅ is the wavelet, and J is the scale. The wavelet is finite and it can be viewed as a Finite Impulse Response filter. According to some embodiments, the implementation is recursive: on each step the signal is passed through a pair of low-pass and high-pass filters derived from the wavelet, followed by signal decimation by 2. In some embodiments, the Fast Wavelet Transform can be implemented with a bank of FIR filters generated based on the selected mother wavelet.

4. Similarly, compute the Fast Wavelet Transform of the far signal for each potential time delay estimations identified at step (2).
5. Compare the sequences of coefficients from the Fast Wavelet Transform of the near and far signals for each potential time delay estimation to determine the most likely time delay between the signals.

The similarity of the two wavelet transforms indicates the quality of the match between the two signals taking into account both the content and the delay. The time delay value for which the sequences of coefficients are most similar reflects the most likely time delay between signals. In some embodiments, the similarity of the two wavelets transforms may be determined by computing a Pearson correlation coefficient between the wavelet sequences of coefficients. The time delay value corresponding to the largest Pearson correlation coefficient is identified as the most likely time delay between signals.

Figure 8:
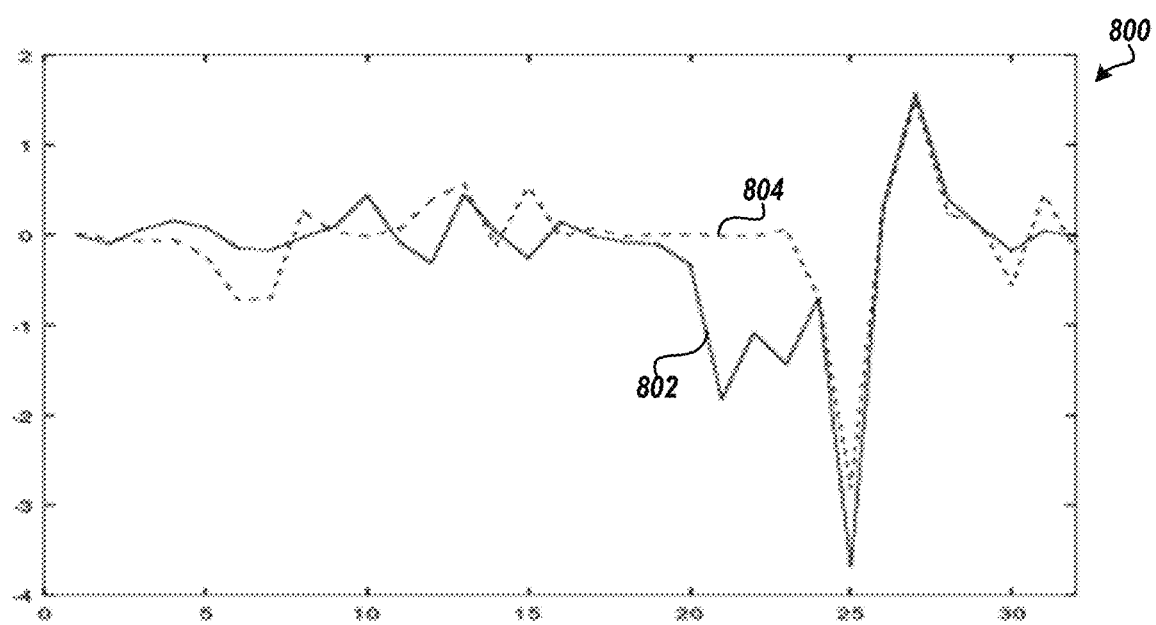
FIG. 8 is a graph of sequences of coefficients from Fast Wavelet Transforms of two signals shown for comparison, according to embodiments presented herein.

FIG. 8 shows an example of the sequence of coefficients 802 and 804 from the Fast Wavelet Transform of a near signal and a far signal, respectively, for a particular potential time delay estimate, using an eight tap Daubechies wavelet. As may be seen in the figure, the sequences of coefficients 802 and 804 are similar for the near and far signals with the exception of coefficients 20 thru 24. According to further embodiments, these mismatched coefficients may be utilized to validate the selection of the most likely time delay between signals. For example, the acoustic analysis module 126 may perform the following process to validate and further refine the estimated time delay between the signals:

1. Identify mismatched coefficients in the comparison of the sequences of coefficients from the Fast Wavelet Transform of the near and far signals (e.g., as shown in FIG. 4). For example, mismatched coefficients may be identified when the difference between the near and far signals exceeds a particular threshold. An optimal threshold value could be established empirically.
2. Compute an inverse wavelet transform from the mismatched coefficients of the near signal.

The inverse wavelet transform should correspond to a spurious wave in the near signal. For example, the inverse wavelet transform of the mismatched coefficients of the near signal 702 may result in the spurious waveform 708 shown in signal graph 700B of FIG. 7.

3. Subtract the spurious wave computed in step (2) from the original near signal. Referring again to the example in FIG. 7, the resulting signal 710 shown in signal graph 700C will represent the original near signal 702 with the spurious waveform 708 filtered out.
4. Compare the resulting signal 710 with the original far signal 712, as further shown in FIG. 7.

According to some embodiments, the comparison of the filtered signal 710 with the original far signal 712 may be utilized to fine-tune the time delay estimate. For example, the acoustic analysis module 126 may cross-correlate the filtered signal 710 with the far signal 712 to compute new time delay estimate(s). In further embodiments, the comparison of the signals may be alternatively or additionally utilized to validate the time delay estimate. For example, the acoustic analysis module 126 may compute a correlation coefficient between these signals 710 and 712. If the correlation coefficient (which expresses a similarity test) is above a certain threshold, the acoustic analysis module 126 may accept the most likely time delay value.

Empirical Mode Decomposition

In further embodiments, localized time-frequency analysis of the near and far signals may be performed utilizing Empirical Mode Decomposition ("EMD"). It will be appreciated that the excitation methods described herein generate a band-limited 'pulse' wave type that is non-stationary in both time and frequency. Adaptive decomposition methods such as EMD can be utilized to remove signal noise from higher order modes. Similar to the wavelets processing described above, the EMD processing can be implemented as filter bank type method, with the first band relating to the highest frequency content, the second being slightly lower frequency, and so on. The EMD algorithm decomposes the original signal into several separate components known as "Intrinsic Mode Functions" ("IMFs"). Eventually the residual signal becomes "monotonic" indicating that further signal decomposition by EMD is not needed.

According to some embodiments, the acoustic analysis module 126 module may utilize the EMD algorithm to perform a process generally described as "sifting" through the modes of the original near and far signals, as shown in the steps below:

1. Compute upper and lower envelopes of the signal. According to embodiments, the signal envelopes may be computed with the Hilbert transform or a spline interpolation connecting the local maxima/minima in the signal.

2. Calculate a signal mean by averaging the upper and lower envelopes.
3. Compute a candidate IMF by subtracting the signal mean from the signal.
4. Repeat steps (1), (2), and (3) iteratively for the candidate IMF until IMF criterion are met, producing a valid IMF.
5. Remove the valid IMF from the residual signal.
6. Repeat steps (1), (2), (3), (4), and (5) iteratively for the residual signal until the residual signal becomes monotonic and/or other stopping criteria are met.

In order for a decomposed signal to be a valid IMF, the signal must satisfy certain criteria. In some embodiments, these criteria include 1) the number of extrema and the number of zero crossings must differ by a maximum of 1 (or be equal) and 2) the mean value must be zero. An example of an IMF that satisfies these conditions is a simple sine wave (mean value is zero, difference between minima and maxima is 1 at most). According to further embodiments, a convergence criterion could be used to stop the iterative processing of a candidate IMF. For example, if a standard deviation of the difference between two consecutive IMF candidates is less than a particular threshold.

Figure 9:
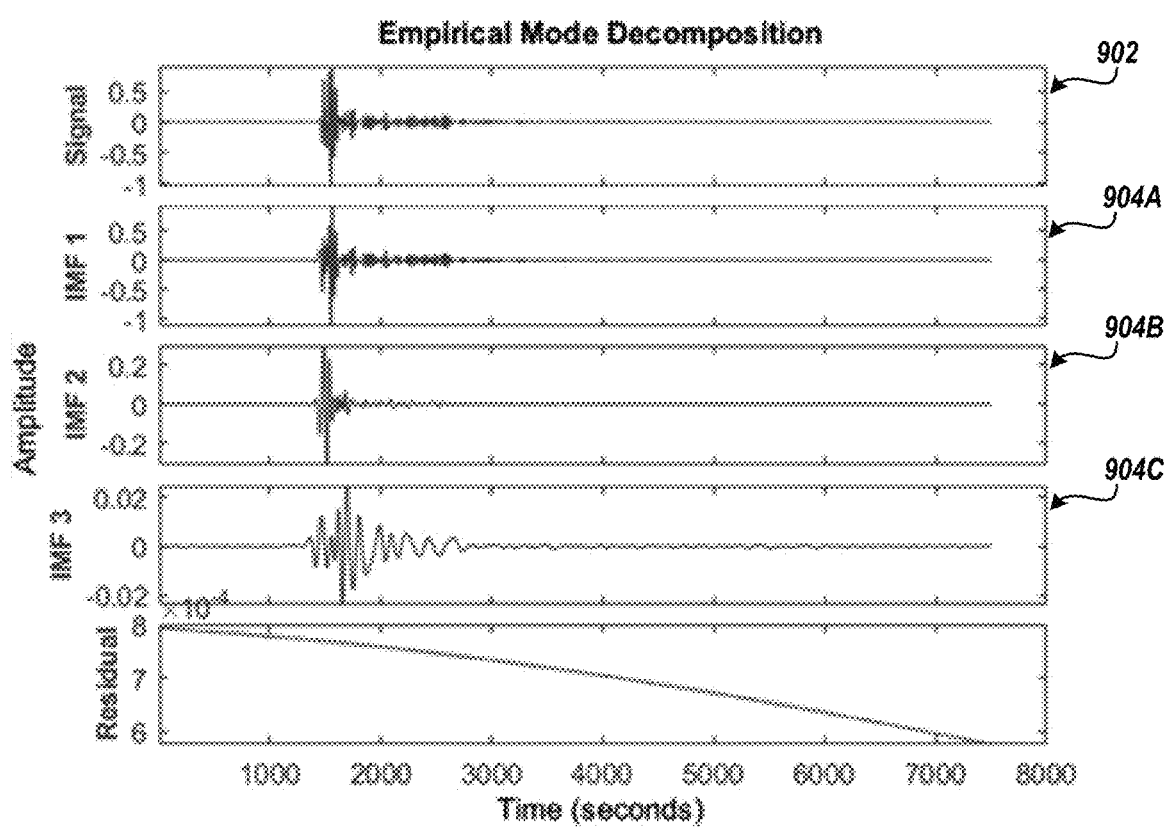
FIG. 9 comprises signal diagrams showing a signal and its decomposition into Intrinsic Mode Functions, according to embodiments presented herein.

Exemplary results of the EMD process are shown in FIG. 9, where an original signal 902 (e.g., the near signal or far signal) is decomposed into three component IMFs 904A, 904B, and 904C, with a monotonic residual signal. Once the original signal has been decomposed into the component IMFs, the acoustic analysis module 126 may compute an estimate of the time delay between the arrival of the acoustical impulses from the excitations at the near and far acoustic sensors 102 by correlating the respective IMF signals from the near and far signals for each component IMF. A more reliable estimation of the time delay value would be expected from the higher level IMFs (lower frequencies) since the low frequencies travel farther in water pipes.

One limitation of EMD is that it is often subject to a mode mixing problem. For example, the intrinsic modes of the near signal and the far signal may not represent the same physical phenomena. In some embodiments, a frequency content comparison may be employed to identify the matching IMFs from the two signals. In further embodiments, white noise of finite amplitude may be added to the signal(s) before processing in a method known as Ensemble EMD. It will be further appreciated that other transforms could be applied beyond EMD and wavelet transforms descried herein to remove the spurious waves 708 from the recorded signal 702, including variational mode decomposition and the like.

Based on the foregoing, it will be appreciated that technologies for providing higher resolution assessment of the condition of pipes of a fluid distribution system by in-bracket excitation of the pipes in multiple locations are presented herein. The above-described embodiments are merely possible examples of implementations set forth for a clear understanding of the principles of the present disclosure. Many variations and modifications may be made to the above-described embodiments without departing substantially from the spirit and principles of the present disclosure. All such modifications and variations are intended to be included within the scope of the present disclosure, and all possible claims to individual aspects or combinations and sub-combinations of elements or steps are intended to be supported by the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or other computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

What is claimed is:
1. A method comprising steps of:
placing a first acoustic sensor and a second acoustic sensor at locations along a pipe, at least one of the first acoustic sensor and the second acoustic sensor in acoustical communication with the pipe;
generating acoustical impulses in the pipe at a first excitation location while recording signal data at the first acoustic sensor and the second acoustic sensor, the signal data representing an arrival of the acoustical impulses at the first and second acoustic sensors;
generating acoustical impulses in the pipe at a second excitation location while recording signal data at the first acoustic sensor and the second acoustic sensor, wherein at least one of the first excitation location and second excitation location is located in-bracket of the first acoustic sensor and the second acoustic sensor;
computing a first time delay between the arrival of the acoustical impulses at the first acoustic sensor and the second acoustic sensor from the signal data recorded at the first and second acoustic sensors during generation of the acoustical impulses at the first excitation location;
computing a second time delay between the arrival of the acoustical impulses at the first acoustic sensor and the second acoustic sensor from the signal data recorded at the first and second acoustic sensors during generation of the acoustical impulses at the second excitation location;
computing an acoustic propagation velocity in a section of the pipe defined by the first excitation location and the second excitation location based on the first time delay, the second time delay, and a distance between the first and second excitation locations; and
determining a condition of the section of the pipe based on the computed acoustic propagation velocity.

2. The method of claim 1, further comprising steps of:
generating acoustical impulses in the pipe at a third excitation location while recording signal data at the first acoustic sensor and the second acoustic sensor;

computing a third time delay between the arrival of the acoustical impulses at the first acoustic sensor and the second acoustic sensor from the signal data recorded at the first and second acoustic sensors during generation of the acoustical impulses at the third excitation location;

computing an acoustic propagation velocity in a second section of the pipe defined by the second excitation location and the third excitation location based on the second time delay, the third time delay, and a distance between the second and third excitation locations; and determining a condition of the second section of the pipe based on the computed acoustic propagation velocity in the second section of the pipe.

3. The method of claim 1, wherein the pipe is at least partially subterraneous, and herein generation of the acoustical impulses in the pipe at the first and second excitation locations is accomplished by mechanical impact of a surface of the ground directly above the first excitation location and the second excitation location along the pipe, respectively.

4. The method of claim 1, further comprising:
determining whether spurious waves exist in the signal data; and
upon determining spurious waves exist, applying at least one filter to the signal data recorded at least one of the first acoustic sensor and the second acoustic sensor before computing the acoustic propagation velocity in the section of the pipe.

5. The method of claim 4, wherein the at least one filter comprises one of a pass-band filter, a wavelet filter, and an Empirical Mode Decomposition filter.

6. The method of claim 1, wherein at least one of the first acoustic sensor and second acoustic sensor is attached to a wall of the pipe.

7. The method of claim 1, wherein the pipe is part of a fluid distribution system.

8. The method of claim 7, wherein generation of the acoustical impulses in the pipe at least one of the first excitation location and the second excitation location is accomplished by mechanical impact with a wall of the pipe or an appurtenance of the fluid distribution system.

9. The method of claim 7, wherein at least one of the first acoustic sensor and the second acoustic sensor is attached to an appurtenance of the fluid distribution system.

10. A non-transitory computer-readable medium containing processor-executable instructions that, when executed by a processor of a pipe assessment system, cause the processor to:
record signal data from a first acoustic sensor and a second acoustic sensor during generation of acoustical impulses in a pipe of a fluid distribution system at a first excitation location, the first and second acoustic sensors in acoustical communication with the pipe;
record signal data from the first acoustic sensor and the second acoustic sensor during generation of acoustical impulses in the pipe at a second excitation location, at least one of the first excitation location and second excitation location located in-bracket of the first acoustic sensor and the second acoustic sensor;
compute a first time delay between an arrival of the acoustical impulses at the first acoustic sensor and the second acoustic sensor from the signal data recorded from the first and second acoustic sensors during generation of the acoustical impulses at the first excitation location;
compute a second time delay between the arrival of the acoustical impulses at the first acoustic sensor and the second acoustic sensor from the signal data recorded at the first and second acoustic sensors during generation of the acoustical impulses at the second excitation location;
compute an acoustic propagation velocity in a section of the pipe defined by the first excitation location and the second excitation location based on the first time delay, the second time delay, and a distance between the first and second excitation locations; and
determine a condition of the section of the pipe based on the computed acoustic propagation velocity.

11. The non-transitory computer-readable medium of claim 10, containing further processor-executable instructions that cause the processor to:
record signal data from the first acoustic sensor and the second acoustic sensor during generation of acoustical impulses in the pipe at a third excitation location;
compute a third time delay between the arrival of the acoustical impulses at the first acoustic sensor and the second acoustic sensor from the signal data recorded at the first and second acoustic sensors during generation of the acoustical impulses at the third excitation location;
compute an acoustic propagation velocity in a second section of the pipe defined by the second excitation location and the third excitation location based on the second time delay, the third time delay, and a distance between the second and third excitation locations; and
determine a condition of the second section of the pipe based on the computed acoustic propagation velocity in the second section of the pipe.

12. The non-transitory computer-readable medium of claim 10, containing further processor-executable instructions that cause the processor to:
determine whether multiple acoustic propagation modes exist in the signal data beyond a primary mode of interest; and
upon determining multiple acoustic propagation modes exist, apply at least one filter to the signal data recorded at least one of the first acoustic sensor and the second acoustic sensor before computing the acoustic propagation velocity in the section of the pipe.

13. The non-transitory computer-readable medium of claim 12, wherein the at least one filter comprises one of a pass-band filter, a wavelet filter, and an Empirical Mode Decomposition filter.

14. The non-transitory computer-readable medium of claim 10, wherein the pipe is at least partially subterraneous, and wherein generation of the acoustical impulses in the pipe at the first and second excitation locations is accomplished by mechanical impact of a surface of the ground directly above the first excitation location and the second excitation location along the pipe, respectively.

15. The non-transitory computer-readable medium of claim 10, wherein at least one of the first acoustic sensor and the second acoustic sensor is attached to an appurtenance of the fluid distribution system.

16. A water distribution system comprising:
a pipe;
a first acoustic sensor and a second acoustic sensor in acoustical communication with the pipe and configured to sense acoustical impulses propagating through the pipe and produce signal data representing the sensed acoustical impulses; and an acoustic analysis module executing on a pipe assessment system communicatively coupled to the first and second acoustic sensors, the acoustic analysis module configured to:
  record signal data from the first and second acoustic sensors during generation of acoustical impulses in the pipe at a first excitation location,
  record signal data from the first and second acoustic sensors during generation of acoustical impulses in the pipe at a second excitation location,
  compute a first time delay between an arrival of the acoustical impulses at the first acoustic sensor and the second acoustic sensor from the signal data recorded from the first and second acoustic sensors during generation of the acoustical impulses at the first excitation location,
  compute a second time delay between the arrival of the acoustical impulses at the first acoustic sensor and the second acoustic sensor from the signal data recorded at the first and second acoustic sensors during generation of the acoustical impulses at the second excitation location, and
  compute an acoustic propagation velocity in a first section of the pipe defined by the first excitation location and the second excitation location based on the first time delay, the second time delay, and a distance between the first and second excitation locations.

17. The water distribution system of claim 16, wherein the first excitation location and the second excitation location are located along the pipe in-bracket of the first acoustic sensor and the second acoustic sensor.

18. The water distribution system of claim 16, wherein the first excitation location is located in-bracket of the first acoustic sensor and the second acoustic sensor and the second excitation location is located out-of-bracket of the first acoustic sensor and the second acoustic sensor.

19. The water distribution system of claim 16, wherein the pipe assessment system is further operable to determine a condition of the first section of the pipe based on the computed acoustic propagation velocity.

20. The water distribution system of claim 19, wherein the pipe assessment system is further operable to:
  record signal data from the first acoustic sensor and the second acoustic sensor during generation of acoustical impulses in the pipe at a third excitation location;
  compute a third time delay between the arrival of the acoustical impulses at the first acoustic sensor and the second acoustic sensor from the signal data recorded at the first and second acoustic sensors during generation of the acoustical impulses at the third excitation location;
  compute an acoustic propagation velocity in a second section of the pipe defined by the second excitation location and the third excitation location based on the second time delay, the third time delay, and a distance between the second and third excitation locations; and
  determine a condition of the second section of the pipe based on the computed acoustic propagation velocity in the second section of the pipe.

\* \* \* \* \*